United States Patent
Hanna et al.

(10) Patent No.: US 12,174,979 B2
(45) Date of Patent: Dec. 24, 2024

(54) SYSTEM AND METHOD FOR MANAGING CRYPTOGRAPHIC KEYS FOR CRYPTOGRAPHICALLY SEALING MEDIA FILES ON CONNECTED MEDIA-CAPTURE DEVICES TO ENHANCE END-USER PRIVACY AND ENABLE OFFLINE CAPTURE

(71) Applicant: TruePic Inc., La Jolla, CA (US)

(72) Inventors: Sherif Hanna, Carlsbad, CA (US); Thomas Zeng, San Diego, CA (US); Chi Shing Chan, San Diego, CA (US); Matthew Robben, Loveland, OH (US)

(73) Assignee: TruePic Inc., San Diego, CA (US)

( * ) Notice: Subject to any disclaimer, the term of this patent is extended or adjusted under 35 U.S.C. 154(b) by 294 days.

(21) Appl. No.: 17/727,012

(22) Filed: Apr. 22, 2022

(65) Prior Publication Data
US 2022/0343005 A1    Oct. 27, 2022

Related U.S. Application Data

(60) Provisional application No. 63/180,212, filed on Apr. 27, 2021.

(51) Int. Cl.
*G06F 21/62*    (2013.01)
*H04L 9/06*    (2006.01)
(Continued)

(52) U.S. Cl.
CPC .......... *G06F 21/62* (2013.01); *H04L 9/0643* (2013.01); *H04L 9/3073* (2013.01);
(Continued)

(58) Field of Classification Search
CPC ..... G06F 21/62; H04L 9/0643; H04L 9/3073; H04L 9/3247; H04L 9/3268; H04L 9/3297
See application file for complete search history.

(56) References Cited

U.S. PATENT DOCUMENTS

| | | |
|---|---|---|
| 5,351,134 A | 9/1994 | Yaguchi |
| 5,499,294 A | 3/1996 | Friedman |

(Continued)

FOREIGN PATENT DOCUMENTS

| | | |
|---|---|---|
| CN | 101258744 A | 9/2008 |
| CN | 102687159 A | 9/2012 |

(Continued)

OTHER PUBLICATIONS

Anjum, Areesha, et al., "Recapture Detection Technique Based on Edge-Types by Analysing High-Frequency Components in Digital Images Acquired through LCD Screens", Multimedia Tools and Applications, vol. 79, Springer, 2020 (Year: 2020), pp. 6965-6985.

(Continued)

*Primary Examiner* — Malcolm Cribbs
(74) *Attorney, Agent, or Firm* — Sheppard Mullin Richter & Hampton LLP

(57) ABSTRACT

In general, one aspect disclosed features a media-capture device, comprising: one or more sensors; a hardware processor; and a non-transitory machine-readable storage medium encoded with instructions executable by the hardware processor to perform a method comprising: initiating acquisition of one or more sensor data samples representing analog phenomena captured by the one or more sensors; receiving the one or more sensor data samples; encoding the one or more sensor data samples; generating a to-be-signed data structure comprising at least one of: the one or more encoded sensor data samples, or one or more cryptographic hashes of the one or more encoded sensor data samples; generating a cryptographic hash of the to-be-signed data structure; determining whether a time-stamping server is reachable over a network connection by the media capture device; and configuring a second data structure based on the (Continued)

determination of whether the time-stamping server is reachable.

18 Claims, 16 Drawing Sheets

(51) Int. Cl.
   *H04L 9/30* (2006.01)
   *H04L 9/32* (2006.01)
(52) U.S. Cl.
   CPC .......... *H04L 9/3247* (2013.01); *H04L 9/3268* (2013.01); *H04L 9/3297* (2013.01)

(56) References Cited

U.S. PATENT DOCUMENTS

| | | |
|---|---|---|
| 6,342,290 B1 | 1/2002 | Conk |
| 6,411,725 B1 | 6/2002 | Rhoads |
| 6,487,301 B1 | 11/2002 | Zhao |
| 6,557,102 B1 | 4/2003 | Wong |
| 6,628,417 B1 | 9/2003 | Naito |
| 6,823,075 B2 | 11/2004 | Perry |
| 6,947,571 B1 | 9/2005 | Rhoads |
| 7,209,571 B2 | 4/2007 | Davis |
| 7,277,576 B2 | 10/2007 | Abbate |
| 7,525,578 B1 | 4/2009 | Barbeau |
| 7,616,777 B2 | 11/2009 | Rodriguez |
| 7,958,458 B2 | 6/2011 | Maeta |
| 8,121,342 B2 | 2/2012 | Davis |
| 8,413,882 B1 | 4/2013 | Nidamarthi |
| 8,443,001 B2 | 5/2013 | Nichols |
| 8,462,209 B2 | 6/2013 | Sun |
| 8,849,819 B2 | 9/2014 | Johnson |
| 8,868,039 B2 | 10/2014 | Rodriguez |
| 8,879,120 B2 | 11/2014 | Thrasher |
| 8,955,137 B2 | 2/2015 | Mousty |
| 9,002,719 B2 | 4/2015 | Tofte |
| 9,082,235 B2 | 7/2015 | Lau |
| 9,300,678 B1 | 3/2016 | Stack |
| 9,594,980 B1 | 3/2017 | Graham |
| 9,609,288 B1 | 3/2017 | Richman |
| 9,614,886 B2 | 4/2017 | Zhong |
| 9,621,565 B2 | 4/2017 | Stack |
| 9,652,460 B1 | 5/2017 | Barisic |
| 9,779,775 B2 | 10/2017 | Pacurariu |
| 9,832,017 B2 | 11/2017 | Malone |
| 9,910,865 B2 | 3/2018 | Mikolajczyk |
| 10,013,568 B2 | 7/2018 | Mityagin |
| 10,095,877 B2 | 10/2018 | Stack |
| 10,102,526 B1 | 10/2018 | Madisetti |
| 10,255,419 B1 | 4/2019 | Kragh |
| 10,277,400 B1 | 4/2019 | Griffin |
| 10,360,668 B1 | 7/2019 | McGregor |
| 10,361,866 B1 | 7/2019 | McGregor |
| 10,375,050 B2 | 8/2019 | Lyons |
| 10,389,733 B2 | 8/2019 | Fasoli |
| 10,404,477 B1 | 9/2019 | Deck |
| 10,467,507 B1 | 11/2019 | Hao |
| 10,635,894 B1 | 4/2020 | Genner |
| 10,726,533 B2 | 7/2020 | McGregor |
| 10,733,315 B2 | 8/2020 | Stack |
| 11,037,284 B1 | 6/2021 | Rice |
| 11,159,504 B2 | 10/2021 | Lyons |
| 11,256,792 B2 | 2/2022 | Tussy |
| 11,334,687 B2 | 5/2022 | Stack |
| 11,373,449 B1 | 6/2022 | Genner |
| 11,544,835 B2 | 1/2023 | Rice |
| 11,646,902 B2 | 5/2023 | McGregor |
| 2002/0056043 A1 | 5/2002 | Glass |
| 2003/0065922 A1 | 4/2003 | Fredlund |
| 2004/0039912 A1 | 2/2004 | Borrowman |
| 2004/0091111 A1 | 5/2004 | Levy |
| 2004/0153649 A1 | 8/2004 | Rhoads |
| 2004/0213437 A1 | 10/2004 | Howard |
| 2005/0125668 A1* | 6/2005 | Botz ............... G06Q 20/3829 713/171 |
| 2005/0273368 A1 | 12/2005 | Hutten |
| 2006/0018506 A1 | 1/2006 | Rodriguez |
| 2006/0036864 A1 | 2/2006 | Parulski |
| 2006/0115111 A1 | 6/2006 | Malone |
| 2006/0120562 A1 | 6/2006 | Fudge |
| 2006/0157559 A1 | 7/2006 | Levy |
| 2006/0218404 A1 | 9/2006 | Ogura |
| 2006/0262976 A1 | 11/2006 | Hart |
| 2007/0019836 A1 | 1/2007 | Thorwirth |
| 2007/0091376 A1 | 4/2007 | Calhoon |
| 2007/0162756 A1 | 7/2007 | Fredlund |
| 2007/0171288 A1 | 7/2007 | Inoue |
| 2008/0005086 A1 | 1/2008 | Moore |
| 2009/0044235 A1 | 2/2009 | Davidson |
| 2009/0320101 A1 | 12/2009 | Doyle |
| 2010/0046748 A1 | 2/2010 | Kusnoto |
| 2010/0250953 A1 | 9/2010 | Wiersma |
| 2010/0281475 A1 | 11/2010 | Jain |
| 2010/0309987 A1 | 12/2010 | Concion |
| 2010/0317399 A1 | 12/2010 | Rodriguez |
| 2011/0085728 A1 | 4/2011 | Gao |
| 2011/0087690 A1 | 4/2011 | Cairns |
| 2011/0156879 A1 | 6/2011 | Matsushita |
| 2011/0221568 A1 | 9/2011 | Giobbi |
| 2011/0231645 A1 | 9/2011 | Thomas |
| 2011/0258326 A1 | 10/2011 | Hu |
| 2012/0004949 A1 | 1/2012 | Coleman |
| 2012/0143630 A1 | 6/2012 | Hertenstein |
| 2012/0269425 A1 | 10/2012 | Marchesotti |
| 2012/0278370 A1 | 11/2012 | Nichols |
| 2012/0311623 A1 | 12/2012 | Davis |
| 2013/0041948 A1 | 2/2013 | Tseng |
| 2014/0049653 A1 | 2/2014 | Leonard |
| 2014/0081932 A1 | 3/2014 | Krislov |
| 2014/0198687 A1 | 7/2014 | Raleigh |
| 2014/0244781 A1 | 8/2014 | Klayko |
| 2014/0279493 A1 | 9/2014 | Kamath |
| 2014/0297810 A1 | 10/2014 | Zhong |
| 2014/0324986 A1 | 10/2014 | Zhang |
| 2014/0358964 A1 | 12/2014 | Woods |
| 2015/0016661 A1 | 1/2015 | Lord |
| 2015/0142595 A1 | 5/2015 | Acuna-Rohter |
| 2015/0154436 A1 | 6/2015 | Shi |
| 2015/0213324 A1 | 7/2015 | Farid |
| 2015/0310306 A1 | 10/2015 | Song |
| 2016/0162729 A1 | 6/2016 | Hagen |
| 2016/0224768 A1 | 8/2016 | Boccon-Gibod |
| 2016/0301531 A1 | 10/2016 | Finlow-Bates |
| 2016/0379330 A1 | 12/2016 | Powers |
| 2017/0041306 A1 | 2/2017 | Stack |
| 2017/0041328 A1 | 2/2017 | Stack |
| 2017/0048216 A1 | 2/2017 | Chow |
| 2017/0093867 A1 | 3/2017 | Burns |
| 2017/0118493 A1 | 4/2017 | Hain |
| 2017/0178058 A1 | 6/2017 | Bhat |
| 2017/0180277 A1 | 6/2017 | Brady |
| 2017/0193329 A1 | 7/2017 | Suman |
| 2017/0193594 A1 | 7/2017 | Glasgow |
| 2017/0295232 A1 | 10/2017 | Curtis |
| 2017/0359326 A1 | 12/2017 | Garcia |
| 2017/0373847 A1 | 12/2017 | Chien |
| 2017/0373859 A1 | 12/2017 | Shors |
| 2017/0374622 A1 | 12/2017 | Juhani |
| 2018/0019873 A1 | 1/2018 | Kraemer |
| 2018/0026932 A1 | 1/2018 | Wang |
| 2018/0048474 A1 | 2/2018 | Landrock |
| 2018/0260888 A1 | 9/2018 | Paolini-Subramanya |
| 2018/0357501 A1 | 12/2018 | Ma |
| 2018/0365442 A1 | 12/2018 | Stack |
| 2019/0042722 A1 | 2/2019 | Hansen |
| 2019/0095655 A1 | 3/2019 | Krawczewicz |
| 2019/0109834 A1 | 4/2019 | Lyons |
| 2019/0109981 A1 | 4/2019 | Zhang |
| 2019/0147305 A1 | 5/2019 | Lu |
| 2019/0164285 A1 | 5/2019 | Nye |
| 2019/0251349 A1 | 8/2019 | Duerksen |
| 2019/0281259 A1 | 9/2019 | Palazzolo |

(56) References Cited

U.S. PATENT DOCUMENTS

| | | |
|---|---|---|
| 2019/0391972 A1 | 12/2019 | Bates |
| 2020/0007331 A1 | 1/2020 | Wentz |
| 2020/0012806 A1 | 1/2020 | Bates |
| 2020/0126209 A1 | 4/2020 | Kim |
| 2020/0210768 A1 | 7/2020 | Turkelson |
| 2021/0004949 A1 | 1/2021 | Broyda |
| 2021/0377262 A1 | 12/2021 | Butler |
| 2022/0179998 A1 | 6/2022 | Lamplmair |

FOREIGN PATENT DOCUMENTS

| | | |
|---|---|---|
| CN | 104079830 A | 10/2014 |
| CN | 103345758 B | 8/2016 |
| EP | 3099058 | 11/2016 |
| JP | 2012164064 | 8/2012 |
| WO | 9909743 | 2/1999 |
| WO | 0152178 | 7/2001 |
| WO | 0227431 A2 | 4/2002 |
| WO | 2015020601 A1 | 2/2015 |
| WO | 2017023896 | 2/2017 |

OTHER PUBLICATIONS

Chingovska, Ivana, et al., "On the Effectiveness of Local Binary Patterns in Face Anti-Spoofing", 2012 International Conference on the Biometrics Special Interst Group (BIOSIG), 2012 (Year: 2012), pp. 1-7.

Li, Haoliang, et al., "Image Recapture Detection with Convolutional and Recurrent Neural Networks", Society for Imaging Science and Technology, 2017 (Year: 2017), pp. 87-91.

Liu, Huacheng, et al., "Recaptured Image Detection Based on DCT Coefficients", Journal of Computational Information Systems, vol. 9, No. 20, 2013 (Year: 2013), pp. 8139-8145.

Maatta, J., et al., "Face Spoofing Detection from Single Images Using Texture and Local Shape Analysis", IET Biometrics, 2012 (Year: 2012), pp. 3-10.

Patel, Keyurkumar, et al., "Secure Face Unlock: Spoof Detection on Smartphones", IEEE Transactions on Informatoin Forensics and Security, vol. 11, No. 10, Oct. 2016 (Year: 2016), pp. 2268-2283.

Peixoto, Bruno, et al., "Face Liveness Detection Under Bad Illumination Conditions", 2011 18th IEEE Internatioal Conference on Image Processing, Unicamp, 2011 (Year: 2011), pp. 3557-3560.

Piva, Alessandro, "An Overview on Image Forensics", Hindawi Publishing Corporation, ISRN Signal Processing, vol. 2013, Article ID 496701, 2012 (Year: 2012), pp. 1-23.

Pollicelli, Debora, et al., "Wild Cetacea Identification Using Image Metadata", JCS&T, vol. 17, No. 1, Apr. 2017 (Year: 2017), pp. 79-84.

Porter, Glenn, et al., "Detection of Second-Generation Images Using an Assessment Criteria Method", Journal of Criminological Resaerch, Policy and Practice, vol. 1, No. 4, 2015 (Year: 2015), p. 207-222.

Thongkamwitoon, Thirapiroon, et al., "An Image Recapture Detection Algorithm Based on Learning Dictionaries of Edge Profiles", IEEE Transactions on Information Forensics and Security, vol. 10, No. 5, May 2015 (Year: 2015), pp. 953-968.

Wang, Kai, "A Simple and Effective Image-Statistics-Based Approach to Detecting Recaptured Images from LCD Screens", Digital Investigation, vol. 23, ELSEVIER, 2017 (Year: 2017), pp. 75-87.

Zhang, Zhiwei, et al., "A Face Antispoofing Database with Diverse Attacks", IEEE, 2012 (Year: 2012) pp. 26-31.

Bhowmik, Deepayan et al., "The Multimedia Blockchain: A Distributed and Tamper-Proof Media Transaction Framework", Digital Signal Processing (DSP), 2017 22nd International Conference on IEEE, 2017, 6 pages (Year: 2017).

Cao, Hong, et al., "Identification of Recaptured Photographs on LCD Screens", IEEE, 978-1-4244-4296-6, 2010, (Year: 2010), pp. 1790-1793.

Chinese Patent Application No. 201680057888.X, Office Action mailed Aug. 5, 2020, 9 pages.

De Las Heras, Lluis-Pere, et al., Use Case Visual Bag-of-Words Techniques for Camera Based Identity Document Classification, 2015 13th International Conference on Document Analysis and Recognition (ICDAR), IEEE, 978-1-4799-1805-8/15, 2015, (Year: 2015), pp. 721-725.

Drescher, Daniel, "Blockchain Basics: A Non-Technical Introduction in 25 Steps", 255 pages, APress, ISBN 978-1-4842-2603-2, 2017, 246 pages (Year: 2017).

European Patent Application No. 16833714.5, Supplementary European Search Report, mailed Nov. 13, 2018, 7 pages.

International Patent Application No. PCT/US2016/045089, an International Search Report and Written Opinion issued by Authorized Officer Lee W. Young, mailed Oct. 21, 2016, 8 pages.

International Patent Application No. PCT/US2018/053059, an International Search Report and Written Opinion issued by Authorized Officer Lee W. Young, mailed Dec. 10, 2018, 13 pages.

International Patent Application No. PCT/US2019/045245, an International Search Report and Written Opinion issued by Authorized Officer Harry C. Kim, mailed Feb. 11, 2020, 14 pages.

Ke, Yongzhen, et al., "Image Recapture Detection Using Multiple Features", International Journal of Multimedia and Ubiquitous Engineering, vol. 8, No. 5, ISSN: 1975-0080 IJMUE, 2013 (Year: 2013 ), pp. 71-82.

Ng, Tian-Tsong, et al., "Discrimination of Computer Synthesized or Recaptured Images from Real Images", Springer, : 10.1007/978-1-4614-0757-7 _ 10, 2013, (Year: 2013), pp. 275-309.

The TCP/IP Guide, tcpipguide.com, 2005, pp. 1-4.

Thongkamwitoon, Thirapiroon, et al., "An Image Recapture Detection Algorithm Based on Learning Dictionaries of Edge Profiles", IEEE Transactions on Information Forensics and Security, vol. 10, No. 5, May 2015, 10.1109/TIFS.2015.2392566, 2015, (Year: 2015), pp. 953-968.

Wang, Kai, "A Simple and Effective Image-Statistics-Based Approach to Detecting Recaptured Images from LCD Screens", Digital Investigation, vol. 23, ELSEVIER, 1742-2876, 2017, (Year: 2017), pp. 75-87.

\* cited by examiner

SYSTEM AND METHOD FOR MANAGING CRYPTOGRAPHIC KEYS FOR CRYPTOGRAPHICALLY SEALING MEDIA FILES ON CONNECTED MEDIA-CAPTURE DEVICES TO ENHANCE END-USER PRIVACY AND ENABLE OFFLINE CAPTURE

CROSS REFERENCE TO RELATED APPLICATIONS

The present application claims priority to U.S. Provisional Patent Application No. 63/180,212, filed Apr. 27, 2021, entitled "SYSTEM AND METHOD FOR MANAGING CRYPTOGRAPHIC KEYS FOR CRYPTOGRAPHICALLY SEALING MEDIA FILES ON CONNECTED MEDIA-CAPTURE DEVICES TO ENHANCE END-USER PRIVACY AND ENABLE OFFLINE CAPTURE," the disclosure thereof incorporated by reference herein in its entirety.

BACKGROUND

The disclosed technology relates generally to the creation, attestation, storage, and usage of cryptographic keys that are used for cryptographically sealing authenticatable digital media files using digital signatures on connected media-capture devices, in a manner that enhances the privacy of the person recording the media while enabling offline capture in situations where the media-capture device temporarily loses network connectivity.

SUMMARY

In general, one aspect disclosed features a media-capture device, comprising: one or more sensors; a hardware processor; and a non-transitory machine-readable storage medium encoded with instructions executable by the hardware processor to perform a method comprising: initiating acquisition of one or more sensor data samples representing analog phenomena captured by the one or more sensors; receiving the one or more sensor data samples; responsive to receiving the one or more sensor data samples, encoding the one or more sensor data samples; generating a to-be-signed data structure comprising at least one of: the one or more encoded sensor data samples, or one or more cryptographic hashes of the one or more encoded sensor data samples; generating a cryptographic hash of the to-be-signed data structure; determining whether a time-stamping server is reachable over a network connection by the media capture device; and configuring a second data structure based on the determination of whether the time-stamping server is reachable.

Embodiments of the media-capture device may include one or more of the following features. In some embodiments, the method further comprises, responsive to determining the time-stamping server is reachable: transmitting a time-stamping request to the time-stamping server, wherein the time-stamping request includes the cryptographic hash of the to-be-signed data structure; receiving a signed time-stamp from the time-stamping server; generating a digital signature data structure over the to-be-signed data structure using the private key of a short-validity cryptographic key pair and including the received signed time-stamp in the digital signature data structure; and configuring the second data structure to include the one or more sensor encoded or unencoded data samples, the to-be-signed data structure, and the digital signature data structure. In some embodiments, the method further comprises, responsive to determining the time-stamping server is reachable, and prior to transmitting the time-stamping request to a time-stamping server: determining whether a stored certificate for a short-validity cryptographic key pair is valid; and responsive to determining the certificate of the short-validity cryptographic key pair is invalid: generating a new short-validity cryptographic key pair comprising a new short-validity public key and a new short-validity private key with short-validity key attributes, generating a certificate signing request for the new short-validity public key, signing the certificate signing request with the new short-validity private key, and transmitting the signed certificate signing request to a registration authority server at the designated logical service endpoint for short-validity key pairs; wherein, responsive to receiving the signed certificate signing request: the registration authority server validates the eligibility of the media-capture device to receive a certificate, and validates that the certificate signing request for the new short-validity public key meets the required attributes for short-validity key pairs; and wherein, responsive to a successful validation of both device eligibility and short-validity key attributes, the registration authority server relays the signed certificate signing request for the new short-validity public key to a certification authority server; wherein, responsive to receiving the related signed certificate signing request for the short-validity public key, the certification authority server issues a signed certificate for the new short-validity public key and relays the signed certificate to the registration authority server; wherein, responsive to receiving the signed certificate for the new short-validity public key, the registration authority server relays the signed certificate for the new short-validity public key to the media-capture device; and responsive to receiving the signed certificate for the new short-validity public key, storing the signed certificate for the new short-validity public key. In some embodiments, the method further comprises transmitting a trusted-time request to the time-stamping server; receiving a trusted-time value from the time-stamping server; and initiating a local clock of the media-capture device using the trusted-time value; wherein determining whether the certificate of the short-validity cryptographic key pair is valid comprises: comparing a validity window of the certificate of the short-validity cryptographic key pair against the local clock. In some embodiments, the method further comprises authenticating with the time-stamping server using long-term authentication credentials prior to transmitting the trusted-time request to the time-stamping server. In some embodiments, the method further comprises, responsive to determining the time-stamping server is not reachable: generating a further digital signature data structure over the to-be-signed data structure using the private key of a long-validity cryptographic key pair, without including a signed time-stamp; and configuring the second data structure to include the one or more sensor encoded or unencoded data samples, the to-be-signed data structure, and the further digital signature data structure that does not include a signed time-stamp. In some embodiments, the method further comprises storing the second data structure in a file system of the media-capture device. In some embodiments, the method further comprises determining whether the media-capture device has been initialized; and responsive to determining the media-capture device has not been initialized, authenticating with a registration authority server using first-time authentication credentials; responsive to successful authentication using the first-time authentication credentials by the registration authority server, transmitting a request for long-term authentication credentials to the registration authority server; responsive to receiving long-term authentication credentials from the registration authority server, storing the long-term authentication credentials for use in subsequent connection attempts to the registration authority server; generating a new long-validity cryptographic key pair, comprising a new public key and a new private key with long-validity key attributes by: generating a certificate signing request for the new long-validity public key, signing the certificate signing request with the new long-validity private key, and transmitting the signed certificate signing request to a registration authority server at the designated logical service endpoint for long-validity key pairs, wherein, responsive to receiving the signed certificate signing request, the registration authority server validates the eligibility of the media-capture device to receive a certificate, and validates that the certificate signing request for the new long-validity public key meets the required attributes for long-validity key pairs; and responsive to a successful validation of both device eligibility and long-validity key attributes, the registration authority server relays the signed certificate signing request for the new long-validity public key to a certification authority server; wherein, responsive to receiving the related signed certificate signing request for the long-validity public key, the certification authority server issues a signed certificate for the new long-validity public key and relays the signed certificate to the registration authority server; wherein, responsive to receiving the signed certificate for the new long-validity public key, the registration authority server relays the signed certificate for the new long-validity public key to the media-capture device; and responsive to receiving the signed certificate for the new long-validity public key: storing the signed certificate for the new long-validity public key, and generating a short-validity cryptographic key pair, comprising a new public key and a new private key with short-validity key attributes, generating a certificate signing request for the new short-validity public key, signing the certificate signing request with the new short-validity private key, and transmitting the signed certificate signing request to a registration authority server at the designated logical service endpoint for short-validity key pairs, wherein, responsive to receiving the signed certificate signing request, the registration authority server validates the eligibility of the media-capture device to receive a certificate and validates that the certificate signing request for the new short-validity public key meets the required attributes for short-validity key pairs; and responsive to a successful validation of both device eligibility and short-validity key attributes, the registration authority server relays the signed certificate signing request for the new short-validity public key to a certification authority server; wherein, responsive to receiving the related signed certificate signing request for the short-validity public key, the certification authority server issues a signed certificate for the new short-validity public key and relays the signed certificate to the registration authority server; wherein, responsive to receiving the signed certificate for the new short-validity public key, the registration authority server relays the signed certificate for the new short-validity public key to the media-capture device; and responsive to receiving the signed certificate for the new short-validity public key, storing the signed certificate for the new short-validity public key.

In general, one aspect disclosed features a non-transitory machine-readable storage medium encoded with instructions executable by a hardware processor of a computing component, the machine-readable storage medium comprising instructions to cause the hardware processor to perform a method for a media-capture device having one or more sensors, the method comprising: initiating acquisition of one or more sensor data samples representing analog phenomena captured by the one or more sensors; receiving the one or more sensor data samples; responsive to receiving the one or more sensor data samples, encoding the one or more sensor data samples; generating a to-be-signed data structure comprising at least one of: the one or more encoded sensor data samples, or one or more cryptographic hashes of the one or more encoded sensor data samples; generating a cryptographic hash of the to-be-signed data structure; determining whether a time-stamping server is reachable over a network connection by the media capture device; and configuring a second data structure based on the determination of whether the time-stamping server is reachable.

Embodiments of the non-transitory machine-readable storage medium may include one or more of the following features. In some embodiments, the method further comprises, responsive to determining the time-stamping server is reachable: transmitting a time-stamping request to the time-stamping server, wherein the time-stamping request comprises the cryptographic hash of the to-be-signed data structure; receiving a signed time-stamp from the time-stamping server; generating a digital signature over the to-be-signed data structure and the signed time-stamp using a private key of a short-validity cryptographic key pair; and configuring the second data structure to include the one or more sensor encoded or unencoded data samples, the to-be-signed data structure, and the digital signature. In some embodiments, the method further comprises, responsive to determining the time-stamping server is reachable, and prior to transmitting the time-stamping request to a time-stamping server: determining whether a certificate of the short-validity cryptographic key pair is valid; and responsive to determining the certificate of the short-validity cryptographic key pair is invalid: generating a new short-validity cryptographic key pair, and transmitting a certificate-signing request to a certification authority server, the certificate-signing request including short-validity parameters of the new short-validity cryptographic key pair, wherein the certification authority server signs the certificate-signing request with a private key of the new short-validity cryptographic key pair. In some embodiments, the method further comprises transmitting a trusted-time request to the time-stamping server; receiving a trusted-time value from the time-stamping server; and initiating a local clock of the media-capture device using the trusted-time value; wherein determining whether the certificate of the short-validity cryptographic key pair is valid comprises: comparing a validity window of the certificate of the short-validity cryptographic key pair against the local clock. In some embodiments, the method further comprises authenticating with the time-stamping server using long-term authentication credentials prior to transmitting the trusted-time request to the time-stamping server. In some embodiments, the method further comprises, responsive to determining the time-stamping server is not reachable: generating a further digital signature over the to-be-signed data structure using a private key of a long-validity cryptographic key pair; and configuring the second data structure to include the one or more sensor encoded or unencoded data samples, the to-be-signed data structure, and the further digital signature. In some embodiments, the method further comprises storing the second data structure in a file system of the media-capture device. In some embodiments, the method further comprises determining whether the media capture device has been initialized; and responsive to determining the media-capture device has not been initialized, generating a long-validity cryptographic key pair, generating a short-validity cryptographic key pair, and transmitting a request for long-term authentication credentials to a registration authority server.

In general, one aspect disclosed features a computer-implemented method for a media-capture device having one or more sensors, the method comprising: initiating acquisition of one or more sensor data samples representing analog phenomena captured by the one or more sensors; receiving the one or more sensor data samples; responsive to receiving the one or more sensor data samples, encoding the one or more sensor data samples; generating a to-be-signed data structure comprising at least one of: the one or more encoded sensor data samples, or one or more cryptographic hashes of the one or more encoded sensor data samples; generating a cryptographic hash of the to-be-signed data structure; determining whether a time-stamping server is reachable over a network connection by the media capture device; and configuring a second data structure based on the determination of whether the time-stamping server is reachable.

Embodiments of the computer-implemented method may include one or more of the following features. Some embodiments comprise, responsive to determining the time-stamping server is reachable: transmitting a time-stamping request to the time-stamping server, wherein the time-stamping request comprises the cryptographic hash of the to-be-signed data structure; receiving a signed time-stamp from the time-stamping server; generating a digital signature over the to-be-signed data structure and the signed time-stamp using a private key of a short-validity cryptographic key pair; and configuring the second data structure to include the one or more sensor encoded or unencoded data samples, the to-be-signed data structure, and the digital signature. Some embodiments comprise, responsive to determining the time-stamping server is reachable, and prior to transmitting the time-stamping request to a time-stamping server: determining whether a certificate of the short-validity cryptographic key pair is valid; and responsive to determining the certificate of the short-validity cryptographic key pair is invalid: generating a new short-validity cryptographic key pair, and transmitting a certificate-signing request to a certification authority server, the certificate-signing request including short-validity parameters of the new short-validity cryptographic key pair, wherein the certification authority server signs the certificate-signing request with a private key of the new short-validity cryptographic key pair. Some embodiments comprise transmitting a trusted-time request to the time-stamping server; receiving a trusted-time value from the time-stamping server; and initiating a local clock of the media-capture device using the trusted-time value; wherein determining whether the certificate of the short-validity cryptographic key pair is valid comprises: comparing a validity window of the certificate of the short-validity cryptographic key pair against the local clock. Some embodiments comprise authenticating with the time-stamping server using long-term authentication credentials prior to transmitting the trusted-time request to the time-stamping server. Some embodiments comprise responsive to determining the time-stamping server is not reachable: generating a further digital signature over the to-be-signed data structure using a private key of a long-validity cryptographic key pair; and configuring the second data structure to include the one or more sensor encoded or unencoded data samples, the to-be-signed data structure, and the further digital signature. Some embodiments comprise storing the second data structure in a file system of the media-capture device. Some embodiments comprise determining whether the has been initialized; and responsive to determining the media-capture device has not been initialized, generating a long-validity cryptographic key pair, generating a short-validity cryptographic key pair, and transmitting a request for long-term authentication credentials to a registration authority server.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
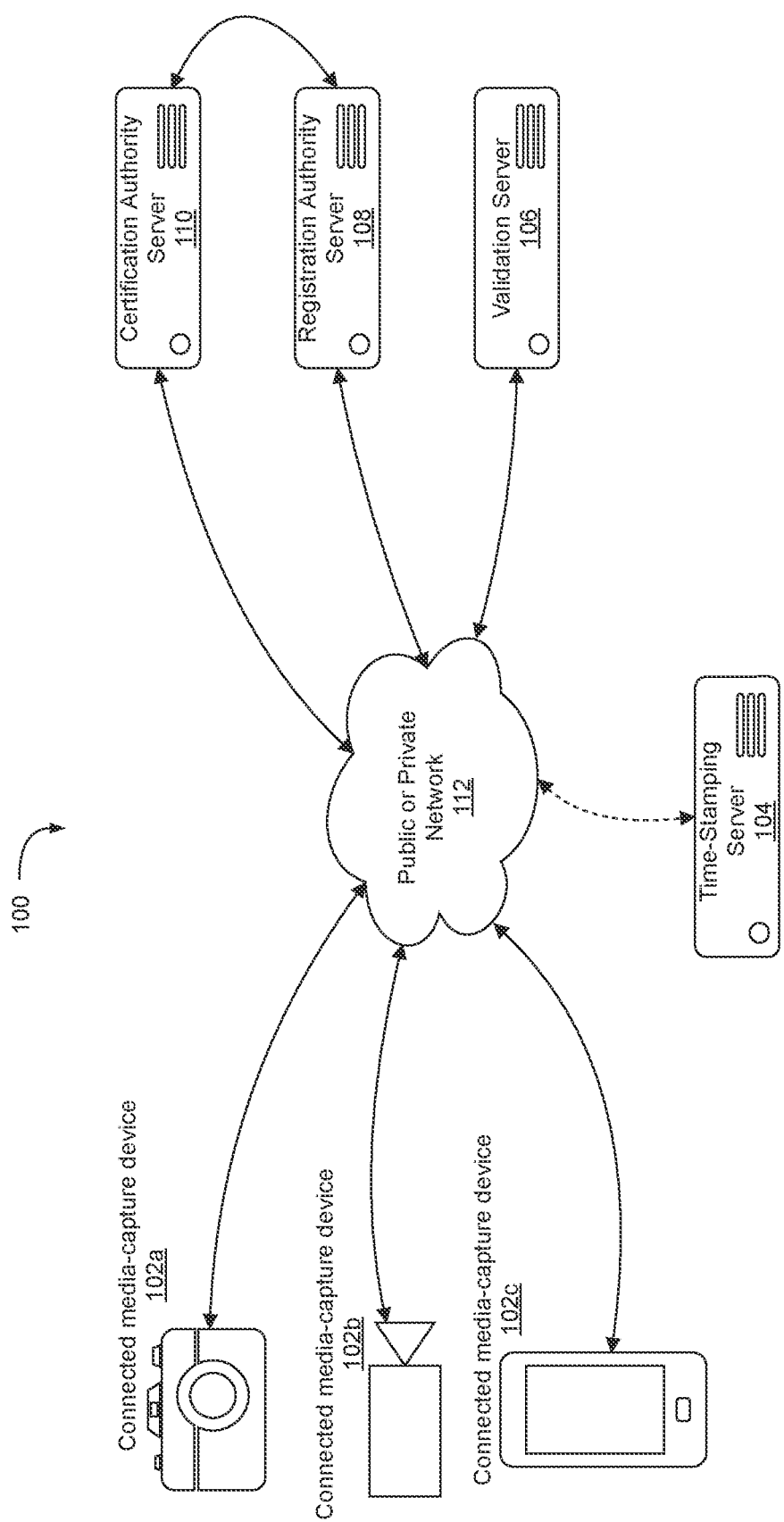
FIG. 1 is a block diagram of a system for capturing authenticatable digital media files on connected media-capture devices according to some embodiments of the disclosed technologies.

The figures are not exhaustive and do not limit the present disclosure to the precise form disclosed.

DETAILED DESCRIPTION

Digital media files, such as photos, videos, audio recordings, are created by media-capture devices that digitize analog phenomena into binary information, then encode this binary information into files for storage, transport, or both. Typically, the binary files that encode the digitization of the analog phenomenon carry additional information (typically called metadata) which provides additional information about the media file which may be helpful to the viewer. For example, this metadata may include the date and time when the media was captured and digitized or the location where that took place. Some of the metadata may be the result of the digitization of the analog phenomena (e.g. a capture device's location inferred from a radio transceiver that captures satellite or cellular signals and computes a device's location).

While the resulting media file, which carries both the digitized audiovisual phenomena and the metadata, ostensibly reflects a faithful reproduction of the analog environment that the media-capture device digitized, there is typically no way for a downstream consumer of the media file to know that with any certainty. It is possible and in fact common for the binary information in media files to be manipulated without leaving evidence of manipulation. While several categories of manipulations are entirely benign, some manipulations may be intended to deceive the media consumer. For example, a manipulator may use several readily-available tools and emerging artificial intelligence (AI) technology to add or remove objects from a photo, swap faces in videos, or synthesize someone else's voice to replace words in a recorded speech. This leaves the media consumer possibly defenseless against such manipulations, especially as the technology that enables manipulation grows more sophisticated to evade forensic detection techniques.

Cryptographic digital signatures are a commonly used technology that can be used to authenticate digital files. Digital signatures may use public key cryptography, which is an approach that relies on a key pair. One key, called the private key, is kept secret by its holder. The other key, called the public key, is distributed openly to other parties that want to communicate with the holder.

While public key cryptography has several applications, including encrypting data to prevent a third party from eavesdropping on communications between two parties, this invention is concerned with the use of cryptographic key pairs to prove the integrity and authenticity of digital data sent from the holder of the key pair to a recipient. The private key is used to generate a digital signature. The public key is used to verify the digital signature.

To illustrate the mechanism, let us posit two parties that need to communicate, Alice and Bob. Alice wants to send a digital file to Bob. Bob wants to ensure that the file he received really came from Alice, and both Bob and Alice have a vested interest in knowing that the file's contents have not been tampered with since Alice created it.

Alice and Bob can leverage digital signatures to achieve both objectives. To begin with, Alice obtains or generates a cryptographic key pair. Tying the key pair to Alice's identity is necessary to achieve the first objective, which is to allow Bob to know that the file really came from Alice. The association of the key pair with Alice's identity is performed by a Certification Authority (CA), a service that Bob trusts to perform the association process correctly. The CA issues a cryptographic certificate to Alice, signed by the CA's private key, attesting to the fact that Alice is the holder of that particular public key (which is in turn mathematically tied to the private key).

To generate a digital signature for the file that she wishes to send to Bob, Alice computes a cryptographic hash over the binary bits that constitute the file. The value of the cryptographic hash is a compact, theoretically unique representation of the contents of the file. Modifying even a single binary bit in the file results in a completely different hash value. Therefore, the computed hash value can be used to ascertain that the file that Bob received is a faithful, unmodified copy of the original one created by Alice. However, computing the hash by itself is not sufficient. Rather, Alice must use her private key to encipher the hash into a digital signature. The digital signature is then either embedded into or bundled with the file in some way, almost always including the value of the public key that can be used to verify it. The digital signature, generated using a key pair that has been attested to by a trusted CA, is Bob's guarantee that the file he received is the original one that Alice personally intended to send.

This strong tie between the value of a public key and the identity of the signer is normally a highly-desired property of digital signatures. For example, consumers indirectly rely on this property to ensure that the software they are installing on their personal devices really came from the software developer, and has not been modified with harmful malware in transit. But for some use cases, this strong tie between the public key value and the unique identity of the non-machine entity that generated the signature is undesirable for privacy and safety reasons. In some cases, it can be downright dangerous.

Consider a case where Alice uses her private key to generate digital signatures to prove to recipients the integrity of her photos or videos. All photos and videos signed by Alice would also contain her public key as part of the data structure that houses the digital signature. Now, consider the scenario where Alice has posted some of her signed photos on her public social media profile. Some time later, Alice, who is a political activist, captures cryptographically signed photos of a controversial event, for example, brutality by state security forces against demonstrators. She does not post this latter set of photos to her public social media profile for fear of reprisal, but she shares them privately with other activists. Eventually, those photos end up in the hands of state security forces, who want to arrest the photographer. While the digital signatures in those photos guarantee their authenticity, they also point definitively to Alice as the photographer. State security forces can simply compare the public key in those photos to the public key in Alice's other photos on her public social media profile, and they would have incontrovertible proof that Alice was the photographer.

Consider a slightly different scenario where the public key was not tied to Alice's personal identity, but to the unique identity of her smartphone. That is, the camera software on Alice's smartphone used the same key pair to generate the digital signatures for her photos and videos. Even in this case, the presence of the same public key in two photos, where one is known to have come from Alice, immediately points to the other one as having come from Alice's phone as well.

This "leaking" of identity via public key values is one of the critical problems that this invention aims to solve. At the same time, the method used to solve the privacy shortcomings also addresses the cornerstone requirement of the overall system, which is to cryptographically seal the media files in a way such that their authenticity can be verified even after the keys used to sign them are no longer valid. Finally, since the methods to address the privacy and long-term authentication requirements necessitate a live network connection between the connected media-capture device and the Certification Authority Server backend, a compromise is made to enable capture in instances where a live network connection isn't available, creating a balanced approach to privacy, long term validity, and service availability.

The validity period of a cryptographic key is a very important attribute, and is generally recorded in the cryptographic certificate that is issued by a Certification Authority Server for a key pair. The validity period defines the time window during which it is valid for the key pair holder to use the key pair to encipher data or generate digital signatures. Parties relying on enciphered data or digital signatures generated using cryptographic keys nearly always verify that cryptographic operations performed using those keys were performed during the validity window stored in the key pair's corresponding certificate.

The system and method disclosed herein revolve around the generation and management of two types of cryptographic key pairs, with substantively different validity periods, and the mechanism to make decisions based on real-time operating conditions on which of the two types of keys to use for generating digital signatures to cryptographically seal captured media files. One type of key pair has a long validity period and is intended to be stored and used in situations where the connected media-capture device intermittently has no active network connection during a capture operation—that is, the use of the long-validity key pair is intended to be a fallback exception rather than the rule. The other type of key pair has a short validity period, and is intended to be generated, signed, used then destroyed after a short duration. This would be the default type of key pair used on the connected media-capture device during a capture operation.

The absolute values of the long and short validity periods can be chosen by the implementer to suit different security and operational objectives. For example, the long-validity key pair may be valid for one year, while the short-validity key pair may be valid for one day. For the purposes of preserving user privacy, and avoiding the accidental leaking of user identity via re-using the same key pair for extended periods of time, a very limited window of only a few hours could be chosen for the short-validity key pair. The limited duration may be designed to mimic the expected length of a capture session. A constrained validity window would mean that the key pair would be used for a limited number of capture operations before having to be replaced by a new one. All media files bearing digital signatures created by that key pair during the validity window can be associated with each other as having come from the same user or device. However, because of the limited time window, media files from different capture sessions cannot be associated with each other (via the public key value) as having come from the same user or device. Applying this mechanism to our earlier example, there would be no way for state security forces to tie the photos of the protest back to Alice via comparing the public keys in those files to her earlier, publicly-posted captures.

The use of short-validity key pairs to generate digital signatures would normally also restrict the time window within which those digital signatures would be considered valid by a recipient. Absent a mitigating mechanism, a digital signature generated using a key pair that is valid for only a few hours would itself be considered valid only during that identical time window. Therefore the system and method disclosed herein rely on trusted time-stamping techniques, to prove that the time at which the digital signature was created fell within the validity window of the key pair. The trusted time-stamp would then also help establish the moment at which the media file was created in its final form, replacing or superseding other untrusted time indicators in the media file.

Trusted time-stamping is typically performed by a network-connected time-stamping server, meaning that a connected media-capture device would require an active network connection to that server during capture operations. If the connected media-capture device is unable to establish a connection to the time-stamping server, the use of a short-validity key pair would render the digital signature practically useless, as without a trusted time-stamp it would only be valid for that limited duration. This is where the long-validity key pair comes in. Digital signatures created using this type of key pair would be valid for a longer period even without a trusted time-stamp, and as long as the recipient receives and verifies the digital signature within that time window, it would be considered valid. The lack of a trusted time-stamp accompanying the digital signature, however, eliminates the possibility of establishing the moment at which the media file was created in its final form. All that could be said about the media file would be that it was created at some point within the long validity window.

From a functional standpoint, it is the Certification Authority Server that ultimately confers the validity period on the key pair, as it seals that validity window into the cryptographic certificate which it issues for the key pair. The Certification Authority Server may impose additional requirements on the key pairs, such as key algorithm and length, that are specific to the long- or short-validity nature of the keys.

FIG. 1 is a block diagram of a system 100 for capturing authenticatable digital media files on connected media-capture devices according to some embodiments of the disclosed technologies. Referring to FIG. 1, the system 100 may include various types of network-connected media-capture devices 102*a* . . . 102*n*. For example, as depicted in FIG. 1, the devices 102 may include a digital camera 102*a*, a closed-circuit television camera (CCTV) 102*b*, a smartphone 102*c*, and other media-capture devices. However, these devices here are only examples. The disclosed technologies may be utilized in any kind of media-capture device, and independently of what analog phenomena the device digitizes and records.

The system 100 may include a time-stamping server 104. The time-stamping server 104 may provide a trusted time value that media-capture devices 102 may use to apply trusted timestamps to the media files they create, thereby proving the existence of the data contained in the media file at a given moment in time.

The system 100 may include a registration authority server 108. The registration authority server 108 may authenticate and approve requests from media-capture devices for cryptographic credentials. The system 100 may include a certification authority server 110. The certification authority server 110 may issue the cryptographic credentials. The system 100 may include a validation server 106. The validation server 106 may confirm the validity of the cryptographic credentials.

The system 100 may communicate via a network 112. The network 112 may be public, private, or a combination thereof, and may include the Internet.

While the functions of the time-stamping server 104, registration authority server 108, certification authority server 110, validation server 106 are depicted separately, it should be understood that this is a separation of logical functions, and should not be construed as a mandate for a physical separation of these functions across different servers or machines. In some implementations, these functions may be combined together in various permutations or further subdivided as needed.

Figure 2:
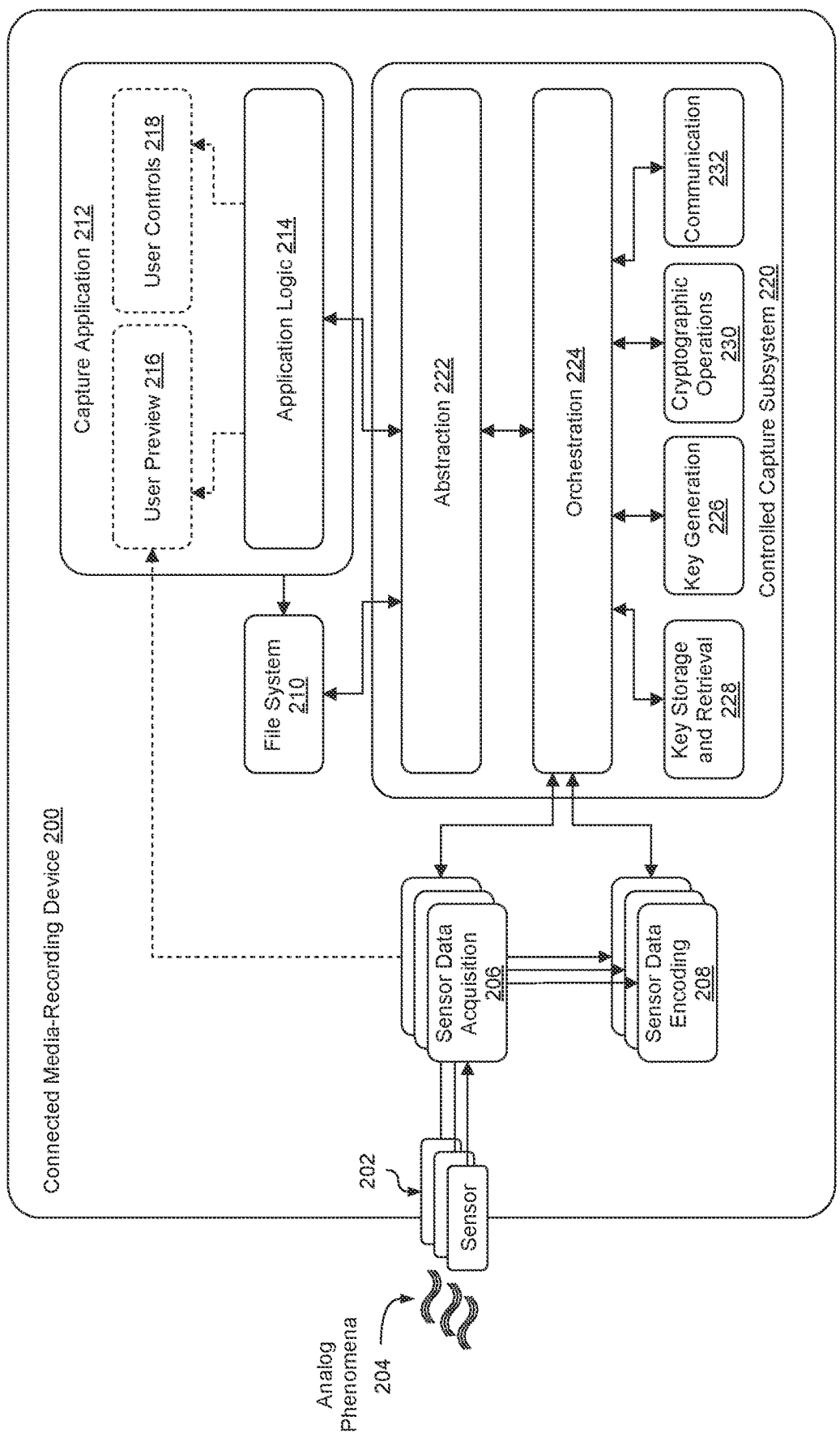
FIG. 2 is a block diagram of a connected media-capture device according to some embodiments of the disclosed technologies.

FIG. 2 is a block diagram of a connected media-capture device 200 according to some embodiments of the disclosed technologies. The media-capture device 200 may be implemented as described above. Referring to FIG. 2, the connected media-capture device 200 may include one or more sensors 202. Each sensor 202 may convert analog phenomena 204 into electrical signals. The analog phenomena 204 may include any analog phenomena, for example such as light, sound, temperature, radio signals that can be used to infer location, and similar analog phenomena. The electrical signals may be analog or digital, depending on sensor type.

The core system of the media-capture device 200 may include one or more sensor data acquisition modules 206. The sensor data acquisition modules 206 may acquire and optionally preprocess the signals from sensors 202. The media-capture device 200 may include a different sensor data acquisition module 206 for each sensor 202, or one or more sensors 202 may share a data acquisition module 206. Each sensor data acquisition module 206 may be implemented in a dedicated or shared hardware block, software code that executes in a dedicated or shared processor, or a combination of both.

The core system of the media-capture device 200 may include one or more sensor data encoding modules 208. Each sensor data encoding module 208 may encode preprocessed sensor data into a final form. The encoding may compact the sensor data or change its representation in order to make it understandable by downstream recipients, whether human or machine.

The core system of the media-capture device 200 may include a file system 210. The file system 210 may store both ephemeral and non-ephemeral files, including, optionally, media files which may result from the recording activity of the connected media-capture device 200.

The media-capture device 200 may include a capture application (App) 212. The capture application 212 may initiate, control, and receive the results of a media capture operation. In some embodiments, the capture application 212 may be a standalone application that operates autonomously and automatically in the media-capture device 200.

In some embodiments, the capture application 212 may be a user-facing application designed to receive commands from an external actor (e.g., a human user) and relay information about the media capture operation. In such embodiments, the capture application 212 may feature a user control module 218 which is designed to enable an external actor to issue commands to the capture application 212 to effect the capture operation. Also in such embodiments, the capture application 212 may feature a user preview module 216. The user preview module 216 may create a presentation of the sensor data to an external actor that represents a digitized form of the analog phenomena 204. For example, the user preview module 216 in a camera application may present a representation of the data seen by the image sensor through the lens system to a human (e.g., a photographer) via a display subsystem. There may be multiple user preview modules 216 that correspond to different sensors 202 in the media-capture device 200, suitable for the analog phenomena 204 that each sensor 202 converts to electrical signals. In addition to the above-described optional functions, the capture application 212 may contain a core application logic 214 that represents its main business logic.

The media-capture device 200 may include a controlled capture subsystem 220. The controlled capture subsystem 220 may oversee and control capture operations. The controlled capture subsystem 220 may be responsible for generating a final representation of the captured media along with data that can prove its integrity.

The media-capture device 200 may include an abstraction module 222. The abstraction module 222 may act as an interface to the capture application 212 and the file system 210.

The media-capture device 200 may include a key generation module 226. The key generation module 226 may generate cryptographic keys. The cryptographic keys may be used for generating cryptographic primitives such as digital signatures and similar cryptographic primitives.

The media-capture device 200 may include a key storage and retrieval module 228. The key storage and retrieval module 228 may provide non-volatile storage for the cryptographic keys generated by the key generation module 226. The key storage and retrieval module 228 may serve up the cryptographic keys for use by other functions.

The media-capture device 200 may include a cryptographic operations module 230. The cryptographic operations module 230 may generate cryptographic primitives such as digital signatures and cryptographic hashes over data it receives from other functions, possibly using cryptographic keys when needed.

The media-capture device 200 may include a communication module 232. The communication module 232 may transmit and receive data over networks such as the public or private networks 112 of FIG. 1. For example, the communication module 232 may exchange data with the time-stamping server 104, the registration authority server 108, the certification authority server 110, the validation server 106 and/or other entities.

The media-capture device 200 may include an orchestration module 224. The orchestration module 224 may act as the core logic of the controlled capture subsystem 220.

The hierarchy and division of the modules of the connected media-capture device 200 are only logical. In various implementations, these modules may be merged together, subdivided further, and the like. The modules may span multiple physical, logical, or virtual hardware and software components within the media-capture device 200, as well as multiple security boundaries. The module functions may be performed by dedicated hardware, by firmware executing in specialized or generic hardware, by software executing in specialized or generic processing hardware, or any combination thereof. Additionally, these logical modules may make use of hardware, firmware or software resources that are not explicitly depicted in FIG. 2. For example, the resources may include caches, buffers, system memory, and similar resources.

Figure 3A:
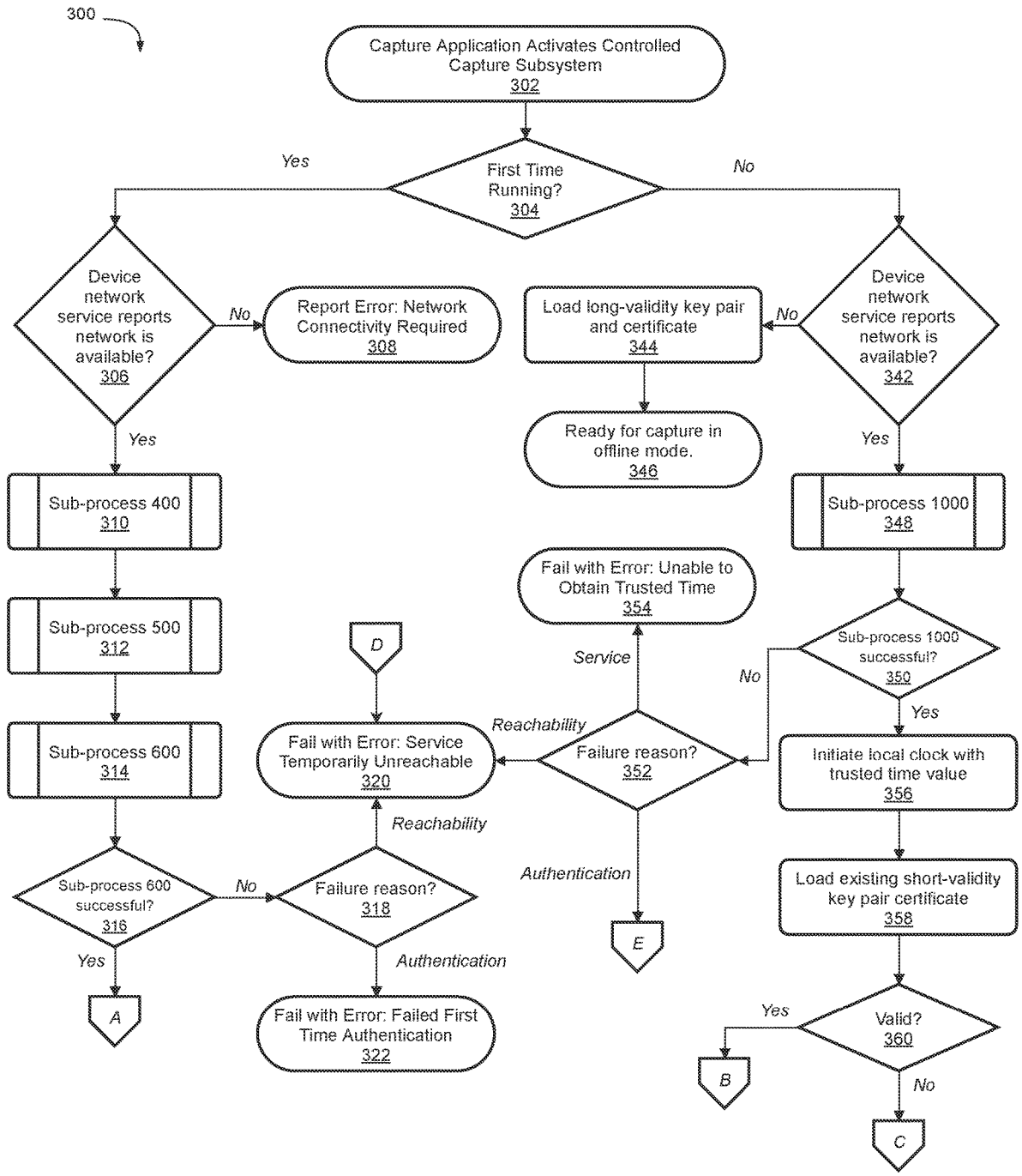
FIGS. 3A and 3B represent a flowchart illustrating a process for readying the cryptographic credentials needed by a connected media-capture device to cryptographically seal digital media files, according to some embodiments of the disclosed technologies.
Figure 3B:
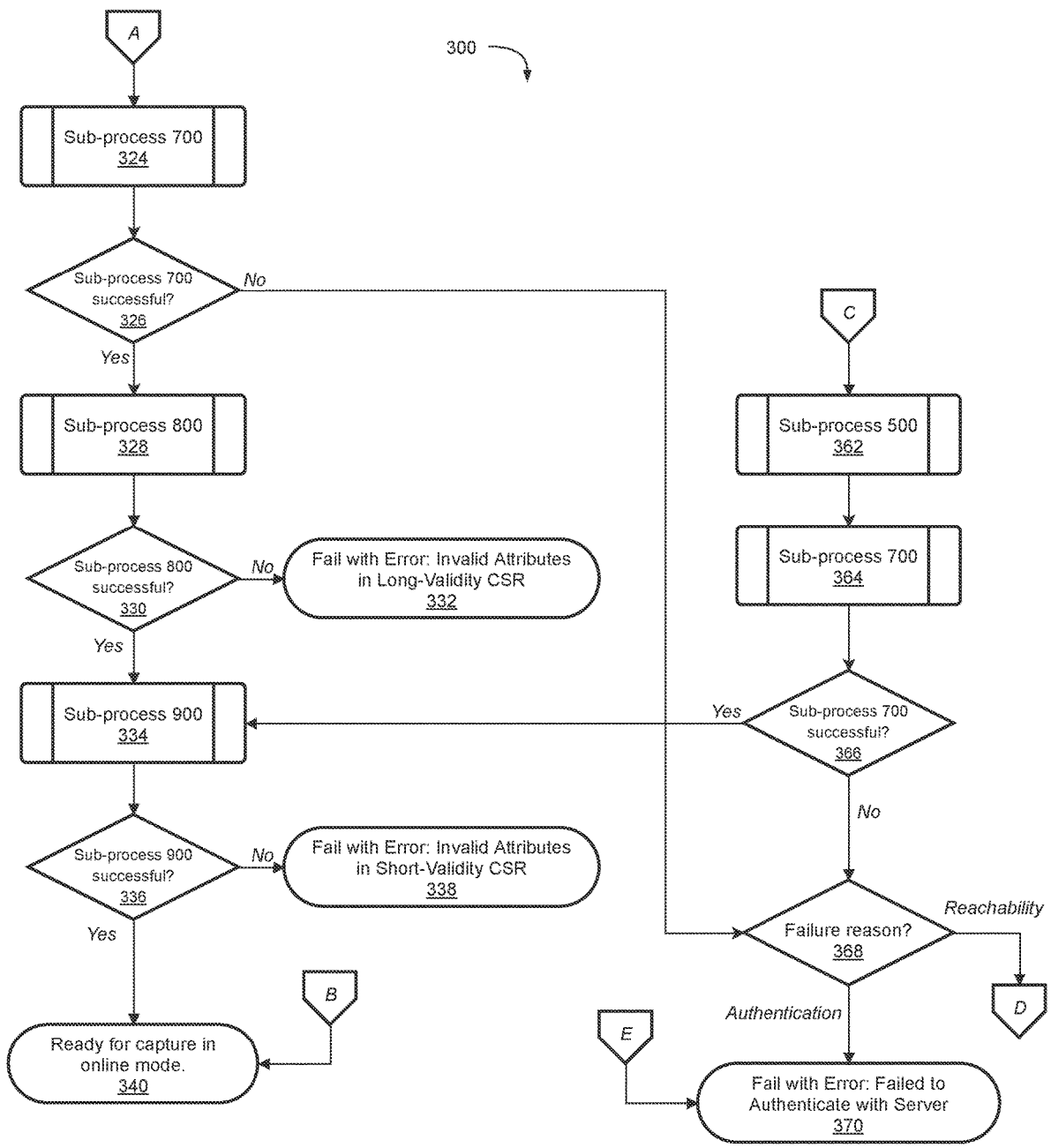

FIGS. 3A and 3B together constitute a flowchart illustrating a process 300 for activating the controlled capture subsystem 220, to prepare the connected media-capture device 200 for capturing authenticatable digital media files, according to some embodiments of the disclosed technologies. The elements of the process 300 are presented in one arrangement. However, it should be understood that one or more elements of the process may be performed in a different order, in parallel, omitted entirely, and the like. Furthermore, the process 300 may include other elements in addition to those presented.

The process 300 may begin with a sequence of actions that results in application logic 214 invoking the controlled capture subsystem 220, as shown in step 302 of FIG. 3A. In some embodiments, the sequence of actions may be initiated by a user. In some embodiments, the invocation may be autonomously effected in the media-capture device 200 without an external agent or trigger. The invocation of the application logic 214 may be the result of the loading of the capture application 212 by an internal or external trigger, or the switching of the capture application 212 into a specialized capture mode (e.g., similar to the invocation of a "panorama" capture mode in a camera app). The application logic 214 in turn may invoke the controlled capture subsystem 220 by sending a message to the abstraction module 222, possibly passing configuration parameters as part of the invocation. The abstraction module 222 in turn may load and activate the orchestration module 224, possibly passing configuration parameters in the process.

Referring again to FIG. 3A, the process 300 may include an evaluation of whether the controlled capture subsystem 220 has been initialized, e.g., whether this is the first time that the controlled capture subsystem 220 has been invoked. For example, referring again to FIG. 2, the orchestration module 224 may evaluate its internal state, possibly relying on reading stored values from the file system 210 via the abstraction module 222, to determine if this is the first time the controlled capture subsystem 220 is being invoked.

Referring again to FIG. 3A, if orchestration module 224 has made a determination, at 304, that this is the first time that the controlled capture subsystem 220 has been invoked, then the process 300 branches into the sub-process that begins with step 306 to initialize cryptographic credentials for both communicating with the registration and certification authority servers, as well as creating digital signature data structures, for the first time. For example, referring again to FIG. 2, the orchestration module 224 may make a request of the communication module 232 to determine whether or not the network service of the connected media-capture device 200 reports that the time-stamping server 104 is reachable over a network connection by the media capture device. If the communication module 232 reports back that the time-stamping server 104 is not reachable, then the orchestration module 224 may report an error to the capture application 212, indicating that network connectivity to the time-stamping server 104 is required, as shown in 308. If, on the other hand, the communication module 232 reports back that the time-stamping server 104 is reachable, then the orchestration module 224 proceeds with the remaining steps in this branch of process 300.

Referring again to FIG. 3, the process 300 may include a sub-process 400 and a sub-process 500, which are invoked either simultaneously or sequentially at 308 and 310 respectively, after a "yes" evaluation at 306. The sub-processes 400 and 500 create two key pairs. Sub-process 400 creates a long-validity cryptographic key pair. Sub-process 500 creates a short-validity key pair.

Figure 4:
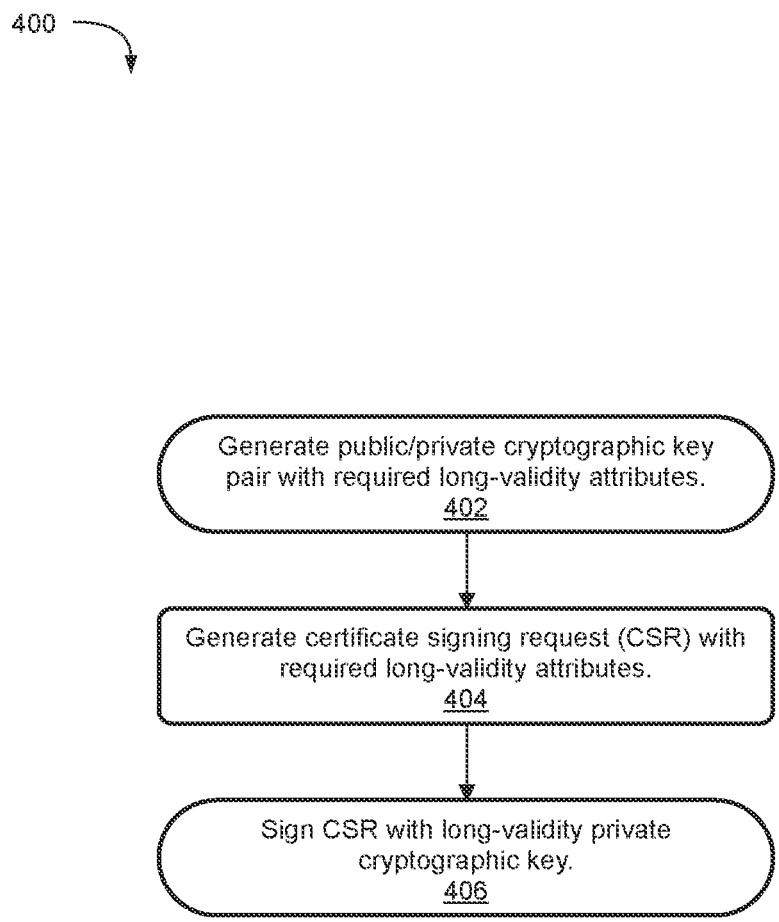
FIG. 4 represents a flowchart illustrating a sub-process for creating a long-validity cryptographic key pair.

Referring to FIG. 4, the sub-process 400 may include the generation of a new long-validity cryptographic key pair, at 402. For example, referring again to FIG. 2, the orchestration module 224 may request the key generation module 226 to generate a new cryptographic key pair, passing along required attributes such as algorithm type and key length that may be expected by the certification authority server 110 of FIG. 1 for a long-validity key pair. This request may trigger a key generation and signature routine as follows. First, the orchestration module 224 may signal the key generation module 226 to generate a new key pair, passing along the key pair type and associated parameters if needed. The key generation module 226 may generate new key pair material. Then, key generation module 226 may signal the key storage and retrieval module 228 to store the new key pair material. On success, the key storage and retrieval module 228 may signal the orchestration module 224, passing along a new key pair handle. Once the key generation module 226 completes the key generation process, it may signal the key storage and retrieval module 228 to store the newly-generated key pair. Once completed, the key storage and retrieval module 228 may inform the key generation module 226 of the successful completion of the storage operation, and the key generation module 226 in turn may inform the orchestration module 224 of the successful generation and storage of the new key pair, and pass along a handle to it.

Referring again to FIG. 4, the sub-process 400 may include the generation of a certificate signing request for the new key pair, at 404. For example, referring again to FIG. 2, the orchestration module 224 may compose a certificate signing request in a format expected by the certification authority server 110 of FIG. 1. The certificate signing request may include the public key from the key pair generated at 402, along with other required attributes such as requested key usage privileges, and identification information that may be required by the registration authority server 108 of FIG. 1 to validate that the controlled capture subsystem 220 of FIG. 2 is authorized to receive signed certificates.

Referring again to FIG. 4, the sub-process 400 may include the signing of the certificate signing request by the private key from long-validity key pair, at 406. For example, referring again to FIG. 2, the orchestration module 224 may request the cryptographic operations module 230 to hash then sign the certificate signing request, passing handles to both the certificate signing request generated at 404 as well as the new key pair generated at 402. Upon success, the cryptographic operations module 230 signals back to the orchestration module 224, passing along a handle to the signed certificate signing request.

Figure 5:
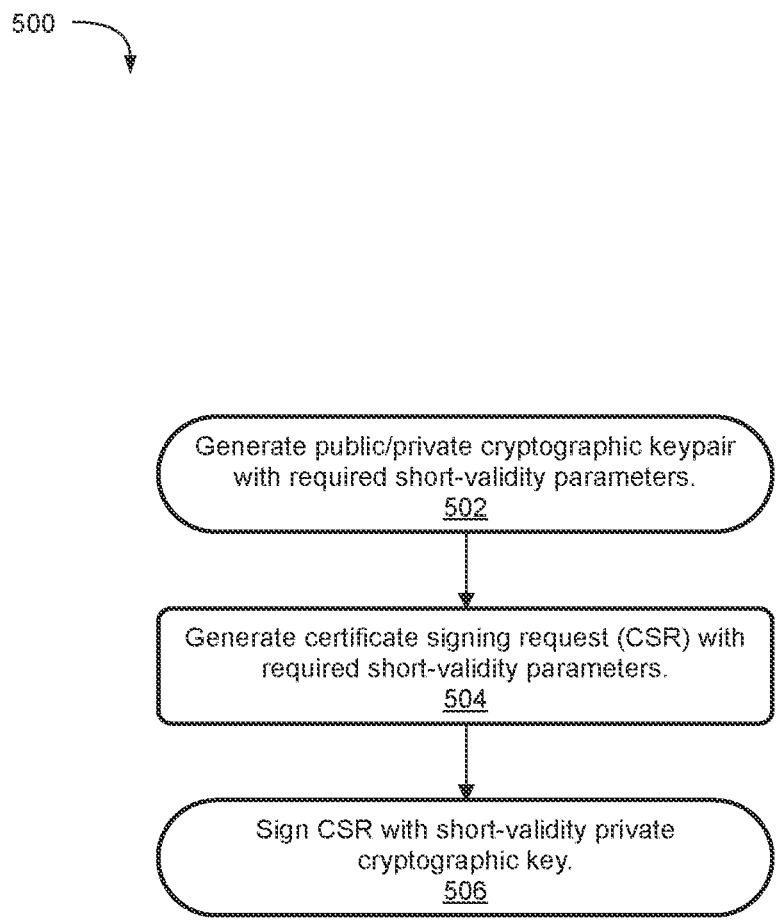
FIG. 5 represents a flowchart illustrating a sub-process for creating a short-validity key pair

Referring to FIG. 5, the sub-process 500 may include the generation of a new short-validity cryptographic key pair, at 502. For example, referring again to FIG. 2, the orchestration module 224 may request the key generation module 226 to generate a new cryptographic key pair, passing along required attributes such as algorithm type and key length that may be expected by the certification authority server 110 of FIG. 1 for a short-validity key pair. This request may trigger a key generation and signature routine as follows. First, the orchestration module 224 may signal the key generation module 226 to generate a new key pair, passing along the key pair type and associated parameters if needed. The key generation module 226 may generate new key pair material. Then, key generation module 226 may signal the key storage and retrieval module 228 to store the new key pair material. On success, the key storage and retrieval module 228 may signal the orchestration module 224, passing along a new key pair handle. Once the key generation module 226 completes the key generation process, it may signal the key storage and retrieval module 228 to store the newly-generated key pair. Once completed, the key storage and retrieval module 228 may inform the key generation module 226 of the successful completion of the storage operation, and the key generation module 226 in turn may inform the orchestration module 224 of the successful generation and storage of the new key pair, and pass along a handle to it.

Referring again to FIG. 5, the sub-process 500 may include the generation of a certificate signing request for the new key pair, at 504. For example, referring again to FIG. 2, the orchestration module 224 may compose a certificate signing request in a format expected by the certification authority server 110 of FIG. 1. The certificate signing request may include the public key from the key pair generated at 502, along with other required attributes such as requested key usage privileges, and identification information that may be required by the registration authority server 108 of FIG. 1 to validate that the controlled capture subsystem 220 of FIG. 2 is authorized to receive signed certificates.

Referring to FIG. 5, the sub-process 500 may include the signing of the certificate signing request by the private key from short-validity key pair, at 506. For example, referring again to FIG. 2, the orchestration module 224 may request the cryptographic operations module 230 to hash then sign the certificate signing request, passing handles to both the certificate signing request generated at 504 as well as the new key pair generated at 502. Upon success, the cryptographic operations module 230 signals back to the orchestration module 224, passing along a handle to the signed certificate signing request.

Referring again to FIG. 3A, responsive to the successful completion of sub-processes 400 and 500 at 310 and 312 respectively, the process 300 may include a sub-process 600, at 314. Referring again to FIGS. 1 and 2, the sub-process 600 attempts to establish communication for the first time between the controlled capture subsystem 220 of FIG. 2 of the connected media-capture device 200 (also represented as items 102a-102n on FIG. 1) and the registration authority server 108 of FIG. 1.

Figure 6:
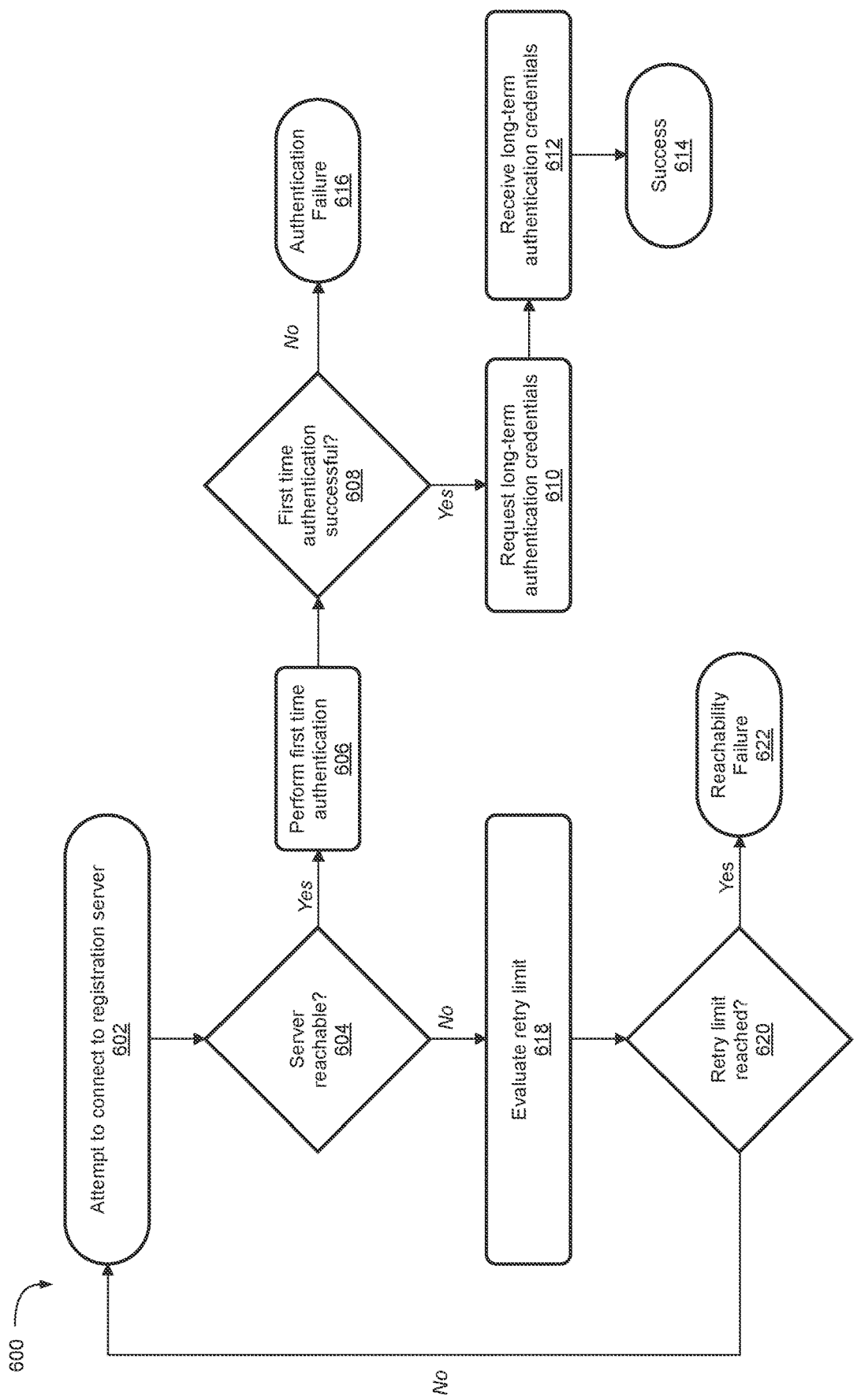
FIG. 6 represents a flowchart illustrating a sub-process for attempting to establish communication for the first time between the controlled capture subsystem of FIG. 2 and the registration authority server of FIG. 1.

Referring to FIG. 6, the sub-process 600 may include an attempt to connect to the registration authority server 108 of FIG. 1, at 602. For example, referring again to FIG. 2, the orchestration module 224 may instruct the communication module 232 to attempt to establish a connection to the registration authority server 108 of FIG. 1, possibly passing along a handle to the requisite first-time authentication credentials expected by the server. Additionally, the orchestration module 224 may pass along additional information needed by the communication module 232 to establish communication with the registration authority server 108, such as the server's network address, server identity as stored in a cryptographic certificate, and/or a logical port address or logical service endpoint (for example, a uniform resource locator) that is designated for first-time authentication.

Referring again to FIG. 6, the sub-process 600 may include an evaluation of whether registration authority server 108 of FIG. 1 was reachable over the network, at 604. For example, referring again to FIG. 2, the communication module 232 may evaluate that the connection attempt made at 602 was successful.

Referring again to FIG. 6, if the result of the evaluation at step 604 was "no", then a retry process may be started, as per 618, 620, and 622. For example, referring again to FIG. 2, the communication module 232 may evaluate if it has already reached the retry limit at 618, which may be the allowed limit of the total number of attempts made to connect to the registration authority server 108 of FIG. 1, or the allowed limit of the total amount of time spent in attempting to establish a connection, a combination of the two, or some other retry limit. If the retry limit has not been reached per the evaluation at 620, then the communication module 232 can attempt to establish communication again, at 602. If, on the other hand, the retry limit has been reached per the evaluation at 620 without successfully establishing a connection with the registration authority server 108 of FIG. 1, then the communication module 232 may end sub-process 600 and return an error code at 622 to the orchestration module 224, indicating a failure to connect to the registration authority server 108 of FIG. 1.

Referring again to FIG. 6, if the result of the evaluation at 604 was "yes", then a first-time authentication process may be initiated with the registration authority server 108 of FIG. 1, at 606. For example, referring again to FIGS. 1 and 2, the registration authority server 108 may issue an authentication challenge to the communication module 232. The communication module 232 may then respond with an authentication reply that may include the first-time authentication credentials provided by the orchestration module 224 at 602.

Referring again to FIG. 6, the sub-process 600 may include an evaluation of whether the authentication with registration authority server 108 of FIG. 1 was successful, at 608. For example, referring again to FIGS. 1 and 2, the communication module 232 may await an authentication response from registration authority server 108 then evaluate it.

Referring again to FIGS. 2 and 6, if the evaluation of the server's response indicates that authentication failed, then the communication module 232 may end the sub-process 600 and return an error code at 616 to the orchestration module 224, indicating a failure to authenticate with the registration authority server 108.

Referring again to FIGS. 2 and 6, if the evaluation of the server's response at 608 indicates that authentication succeeded, then the communication module 232 may transmit a request for long-term authentication credentials to the registration authority server 108 of FIG. 1, at 610. Upon receiving those long-term authentication credentials at 612, the communication module 232 may end sub-process 600 successfully at 614, returning the long-term authentication credentials to orchestration module 224. If the received long-term authentication credentials include a public/private key pair and a certificate for the public key, then the orchestration module 224 may call upon the key storage and retrieval module 228 to store them. Alternatively, the orchestration module 224 may store the long-term authentication credentials in a shared or dedicated partition of the file system 210.

Referring again to FIGS. 1, 2, 3A, 3B, and 6, though sub-process 600 outlines a flow where the long-term authentication credentials (potentially including a public/private key pair and associated public key certificate) are provided to the controlled capture subsystem 220 by the registration authority server 108, it is also possible for the system to distribute authentication credentials in a different manner. For example, the controlled capture subsystem 220 can generate a public/private key pair and corresponding signed certificate signing request that would be used for client authentication, following a process similar to sub-process 400 or 500, either immediately before or after sub-processes 400 and 500. Then, in sub-process 600, step 610 onwards would be replaced by the transmission of the certificate signing request for the long-term authentication key pair from the controlled capture subsystem 220 to the registration authority server 108, and the reception and storage of the client authentication certificate signed by the certification authority server 110.

Referring again to FIG. 3A, process 300 may include an evaluation of whether or not sub-process 600 was successful, at 316. For example, referring again to FIG. 2, the orchestration module 224 may receive results of sub-process 600 from the communication module 232 and make a determination as to whether or not the sub-process was successful.

Referring again to FIG. 3A, if the evaluation of the results of sub-process 600 at 316 indicates a failure, then the process 300 may include an evaluation of the reason for sub-process 600's failure, at 318. For example, referring again to FIG. 2, the orchestration module 224 may evaluate the specific reason for sub-process 600's failure that was reported by communication module 232.

Referring again to FIG. 3A, if the reason for the failure of sub-process 600 as evaluated at 318 was reachability, then the process 300 may terminate with a corresponding error code, at 320. For example, referring again to FIG. 2, if the orchestration module 224 determines that registration authority server 108 of FIG. 1 was unreachable, it may terminate process 300, and respond to the abstraction module 222 with an error code indicating that the service is temporarily unreachable. The abstraction module 222 may in turn respond to the application logic 214 with an error code indicating that the service is temporarily unreachable.

Referring again to FIG. 3A, if the reason for the failure of sub-process 600 as evaluated at 318 was authentication, then the process 300 may terminate with a corresponding error code, at 322. For example, referring again to FIG. 2, the orchestration module 224 may terminate process 300, and respond to the abstraction module 222 with an error code indicating that first-time authentication with the registration authority server 108 of FIG. 1 failed. The abstraction module 222 may in turn respond to the application logic 214 with an error code indicating that first-time authentication with the registration authority server 108 of FIG. 1 failed.

Referring again to FIGS. 3A and 3B, responsive to the evaluation of the success of sub-process 600 at 316 indicating "yes", then process 300 may include a sub-process 700, at 324. Referring again to FIGS. 1 and 6, the sub-process 700 aims to reconnect to the registration authority server 108 using the long-term authentication credentials received at 612 of FIG. 6, in preparation for requesting certificates for the signing key pairs.

Figure 7:
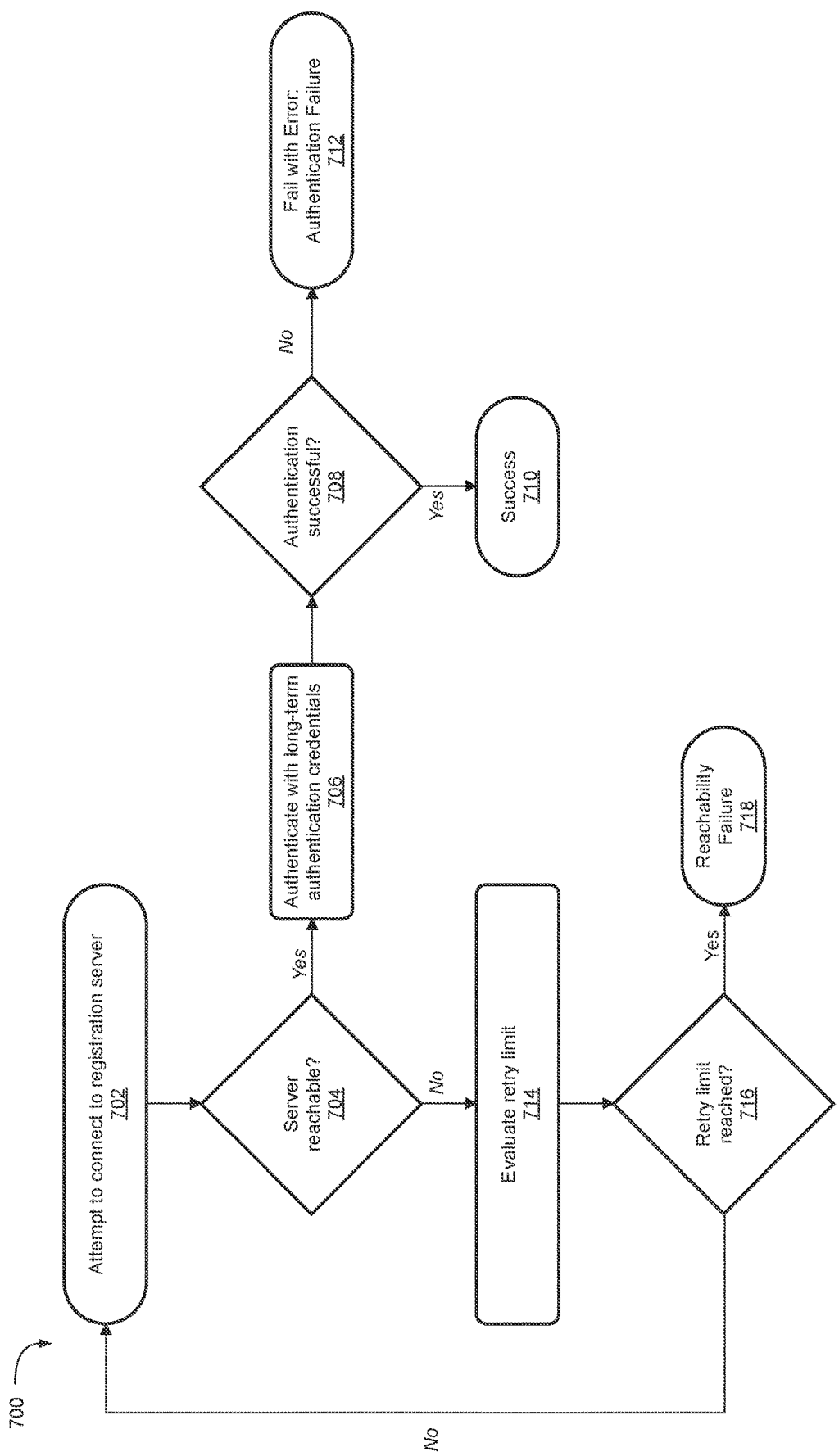
FIG. 7 represents a flowchart illustrating a sub-process for reconnecting to the registration authority server using the long-term authentication credentials received in FIG. 6, in preparation for requesting certificates for the signing key pairs.

Referring to FIG. 7, the sub-process 700 may begin with an attempt to connect to the registration authority server 108 of FIG. 1, at 702. For example, referring again to FIG. 2, the orchestration module 224 may instruct the communication module 232 to attempt to establish a connection to the registration authority server 108 of FIG. 1, passing along a handle to the long-term authentication credentials expected by the server. Additionally, the orchestration module 224 may pass along additional information needed by the communication module 232 to establish communication with the registration authority server 108, such as the server's network address, server identity as stored in a cryptographic certificate, and/or a logical port address or logical service endpoint (for example, a uniform resource locator) that is designated to receive certificate signing requests.

Referring again to FIG. 7, the sub-process 700 may include an evaluation of whether registration authority server 108 of FIG. 1 was reachable over the network, at 704. For example, referring again to FIG. 2, the communication module 232 may evaluate that the connection attempt made at 702 was successful.

Referring again to FIG. 7, if the result of the evaluation at step 704 was "no", then a retry process may be started, as per 714, 716, and 718. For example, referring again to FIG. 2, the communication module 232 may evaluate if it has already reached the retry limit at 714, which may be the allowed limit of the total number of attempts made to connect to the registration authority server 108 of FIG. 1, or the allowed limit of the total amount of time spent in attempting to establish a connection, a combination of the two, or some other retry limit. If the retry limit has not been reached per the evaluation at 716, then the communication module 232 can attempt to establish communication again, at 702. If, on the other hand, the retry limit has been reached per the evaluation at 716 without successfully establishing a connection with the registration authority server 108 of FIG. 1, then the communication module 232 may end sub-process 700 and return an error code at 718 to the orchestration module 224, indicating a failure to connect to the registration authority server 108 of FIG. 1.

Referring again to FIG. 7, if the result of the evaluation at 704 was "yes", then an authentication process may be initiated with the registration authority server 108 of FIG. 1, at 706. For example, referring again to FIGS. 1 and 2, the registration authority server 108 may issue an authentication challenge to communication module 232. Communication module 232 may then respond with an authentication reply that may include the long-term authentication credentials received at 612 of FIG. 6.

Referring again to FIG. 7, the sub-process 700 may include an evaluation of whether the authentication with registration authority server 108 of FIG. 1 was successful, at 708. For example, referring again to FIGS. 1 and 2, the communication module 232 may await an authentication response from registration authority server 108 then evaluate it.

Referring again to FIGS. 2 and 7, if the evaluation of the server's response indicates that authentication failed, then the communication module 232 may terminate sub-process 700 and return an error code at 712 to the orchestration module 224, indicating a failure to authenticate with the registration authority server 108.

Referring again to FIGS. 2 and 7, if the evaluation of the server's response at 708 indicates that authentication succeeded, then the communication module 232 may end sub-process 700 and return a success code at 710 to the orchestration module 224.

Referring again to FIG. 3B, process 300 may include an evaluation of whether sub-process 700 as executed at 324 was successful, at 326. For example, referring again to FIG. 2, the orchestration module 224 may receive results of sub-process 700 from the communication module 232 and make a determination as to whether or not the sub-process was successful.

Referring again to FIG. 3B, if the evaluation of the results of sub-process 700 at 326 indicates a failure, then the process 300 may include an evaluation of the reason for sub-process 700's failure, at 368. For example, referring again to FIG. 2, the orchestration module 224 may evaluate the specific reason for sub-process 700's failure that was reported by communication module 232.

Referring again to FIGS. 3A and 3B, if the reason for the failure of sub-process 700 as evaluated at 368 was reachability, then the process 300 may terminate with a corresponding error code, at 320. For example, referring again to FIG. 2, if the orchestration module 224 determines that registration authority server 108 of FIG. 1 was unreachable, it may terminate process 300, and respond to the abstraction module 222 with an error code indicating that the service is temporarily unreachable. The abstraction module 222 may in turn respond to the application logic 214 with an error code indicating that the service is temporarily unreachable.

Referring again to FIG. 3B, if the reason for the failure of sub-process 700 as evaluated at 368 was authentication, then the process 300 may terminate with a corresponding error code, at 370. For example, referring again to FIG. 2, if the orchestration module 224 determines that authentication with the server failed, it may terminate process 300, and respond to the abstraction module 222 with an error code indicating that authentication failed with the server. The abstraction module 222 may in turn respond to the application logic 214 with an error code indicating that authentication failed with the server.

Referring again to FIGS. 3A and 3B, responsive to the success of sub-process 700 as evaluated at 326, process 300 may include a sub-process 800, at 328. The purpose of sub-process 800 is to obtain a cryptographic certificate from the certification authority server 110 of FIG. 1 for the long-validity public key generated at 310.

Figure 8:
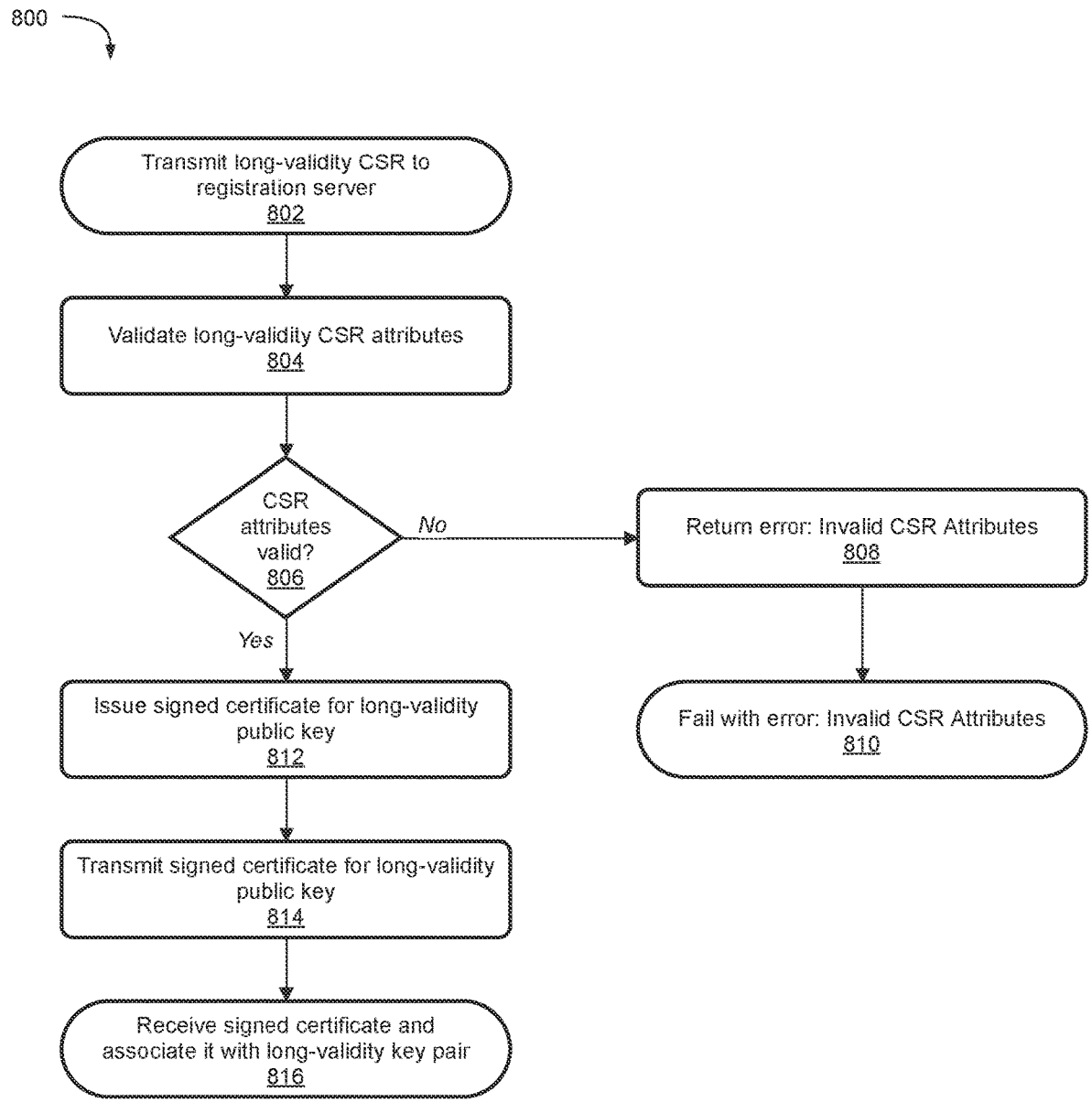
FIG. 8 represents a flowchart illustrating a sub-process for obtaining a cryptographic certificate from the certification authority server of FIG. 1 for the long-validity public key generated in FIG. 3.

Referring to FIG. 8, the process 800 begins with the transmission of the long-validity key pair's signed certificate signing request from the connected media-capture device to the certification authority server infrastructure, at 802. For example, referring again to FIGS. 1 and 2, the orchestration module 224 may pass a handle to the long-validity key pair's signed certificate signing request to the communication module 232, and the communication module 232 may in turn transmit the signed certificate signing request to the registration authority server 108.

Referring again to FIG. 8, responsive to receiving the signed certificate signing request, the sub-process 800 may include a validation step for the contents of the signed certificate signing request, at 804. For example, referring again to FIG. 1, the registration authority server 108 may decode and validate the attributes of the signed certificate signing request for the long-validity key pair, including key algorithm, key length, requested key usage privileges, and the identity of the requesting entity.

Referring again to FIG. 8, the sub-process 800 may include an evaluation, at 806, of whether the attributes of the signed certificate signing request for the long-validity key pair passed validation at 804. For example, referring again to FIG. 1, the registration authority server 108 may make a determination that the validation constraints for long-validity key pairs were sufficiently met by the received signed certificate signing request.

Referring again to FIG. 8, if the result of the evaluation at 806 was "no", then the attribute validation failure may be communicated back to the requesting device, at 808. For example, referring again to FIGS. 1 and 2, the registration authority server 108 may respond to the communication module 232 indicating that certificate issuance was denied because of invalid certificate signing request attributes.

Referring again to FIG. 8, responsive to receiving a message indicating that certificate issuance was denied because of invalid certificate signing request attributes, then sub-process 800 may be terminated with a corresponding error message, at 810. For example, referring again to FIG. 2, the communication module 232 may terminate sub-process 800 and return an error code at 810 to the orchestration module 224, indicating that the attributes of the signed certificate signing request for the long-validity key were invalid.

Referring again to FIG. 8, if the result of the evaluation at 806 was "yes", then sub-process 800 may include the issuing of a signed certificate for the long-validity public key, at 812. For example, referring again to FIG. 1, the registration authority server 108 may relay the validated signed certificate signing request to the certification authority server 110. Responsive to receiving the validated certificate signing request, the certification authority server 110 may decode it then compose a corresponding cryptographic certificate for the long-validity public key. The certification authority server 110 then signs the certificate with its own private key and relays it to the registration authority server 108.

Referring again to FIG. 8, the sub-process 800 may include the transmission of the signed public key certificate to the requesting device, at 814. For example, referring again to FIGS. 1 and 2, responsive to receiving the signed certificate for the long-validity public key from the certification authority server 110, the registration authority server 108 may transmit the signed certificate to the communication module 232.

Referring again to FIG. 8, the sub-process 800 may include, responsive to receiving the signed certificate for the long-validity public key, the storage of said certificate and its association with the long-validity key pair, at 816. For example, referring again to FIGS. 1 and 2, the communication module 232 may receive the signed certificate for the long-validity public key from the registration authority server 108, and relay it to the orchestration module 224. Responsive to receiving the signed certificate from the communication module 232, the orchestration module 224 may instruct the key storage and retrieval module 228 to store the signed certificate for the long-validity public key, passing a handle to the signed certificate itself, along with a handle to the long-validity key pair with which it should be associated. The key storage and retrieval module 228 may, in turn, store the signed certificate for the long-validity public key, along with the necessary data that associates the certificate with the long-validity key pair, in the file system 210, possibly leveraging interfaces in the orchestration module 224 and abstraction module 222 in the process. The key storage and retrieval module 228 may then signal the orchestration module 224 that the storage operation succeeded, which in turn successfully terminates sub-process 800.

Referring again to FIG. 3B, process 300 may include an evaluation of whether sub-process 800 was successful, at 330. For example, referring again to FIG. 2, the orchestration module 224 may receive results of sub-process 800 from the communication module 232 or the key storage and retrieval module 228, and make a determination as to whether or not the sub-process 800 was successful.

Referring again to FIG. 3B, if the evaluation of the results of sub-process 800 at 330 indicates a failure due to invalid attributes in the signed certificate signing request for the long-validity key pair, then the process 300 may be terminated with a corresponding error code, at 332. For example, referring again to FIG. 2, the orchestration module 224 may terminate process 300, returning an error to abstraction module 222 indicating that the long-validity certificate signing requested included invalid attributes. The abstraction module 222 may in turn respond to the application logic 214 with an error code indicating the same.

Referring again to FIGS. 3A and 3B, responsive to the success of sub-process 800 as evaluated at 330, process 300 may include a sub-process 900, at 334. The purpose of sub-process 900 is to obtain a cryptographic certificate from the certification authority server 110 of FIG. 1 for the short-validity public key generated at 312. Please note that while sub-process 900 may follow immediately after the successful completion of sub-process 800, a different system configuration may require the execution of sub-process 700 once more after successfully completing sub-process 800 but before initiating sub-process 900. For example, if the registration authority server 108 of FIG. 1 is configured with different uniform resource locator (URL) addresses, logical ports, or service endpoints for requesting long-term validity certificates and short-term validity certificates, then it may be necessary to terminate the connection established at 324 at the URL, logical port, or service endpoint of the registration authority server 108 of FIG. 1 designated for requesting long-validity certificates, and reconnect to the URL, logical port, or service point designated for requesting short-validity certificates before proceeding with executing sub-process 900, at 334. If, on the other hand, the distinction between requesting a long-validity certificate versus a short-validity certificate is made via the messages exchanged when the device transmits the certificate signing requests to the server, or via an attribute in the certificate signing requests themselves, then reconnection may not be needed.

Figure 9:
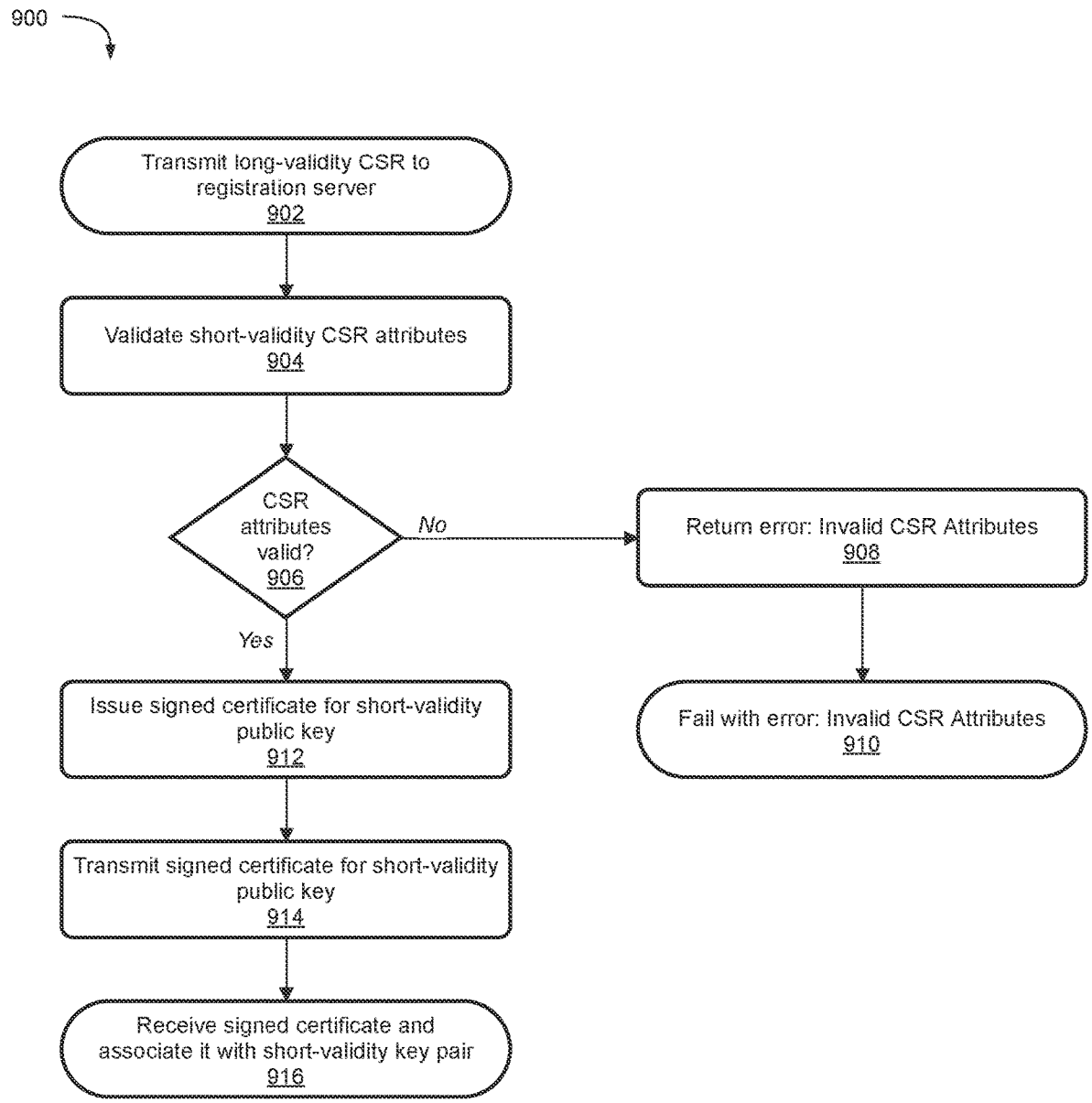
FIG. 9 represents a flowchart illustrating a sub-process for obtaining a cryptographic certificate from the certification authority server of FIG. 1 for the short-validity public key generated in FIG. 3.

Referring to FIG. 9, the sub-process 900 begins with the transmission of the short-validity key pair's signed certificate signing request from the connected media-capture device to the certification authority server infrastructure, at 902. For example, referring again to FIGS. 1 and 2, the orchestration module 224 may pass a handle to the short-validity key pair's signed certificate signing request to the communication module 232, and the communication module 232 may in turn transmit the signed certificate signing request to the registration authority server 108.

Referring again to FIG. 9, responsive to receiving the signed certificate signing request, the sub-process 900 may include a validation step for the contents of the signed certificate signing request, at 904. For example, referring again to FIG. 1, the registration authority server 108 may decode and validate the attributes of the signed certificate signing request for the short-validity key pair, including key algorithm, key length, requested key usage privileges, and the identity of the requesting entity.

Referring again to FIG. 9, the sub-process 900 may include an evaluation, at 906, of whether the attributes of the signed certificate signing request for the short-validity key pair passed validation at 904. For example, referring again to FIG. 1, the registration authority server 108 may make a determination that the validation constraints for short-validity key pairs were sufficiently met by the received signed certificate signing request.

Referring again to FIG. 9, if the result of the evaluation at 906 was "no", then the attribute validation failure may be communicated back to the requesting device, at 908. For example, referring again to FIGS. 1 and 2, the registration authority server 108 may respond to the communication module 232 indicating that certificate issuance was denied because of invalid certificate signing request attributes.

Referring again to FIG. 9, responsive to receiving a message indicating that certificate issuance was denied because of invalid certificate signing request attributes, then sub-process 900 may be terminated with a corresponding error message, at 910. For example, referring again to FIG. 2, the communication module 232 may terminate sub-process 900 and return an error code at 910 to the orchestration module 224, indicating that the attributes of the signed certificate signing request for the short-validity key were invalid.

Referring again to FIG. 9, if the result of the evaluation at 906 was "yes", then sub-process 900 may include the issuing of a signed certificate for the short-validity public key, at 912. For example, referring again to FIG. 1, the registration authority server 108 may relay the validated signed certificate signing request to the certification authority server 110. Responsive to receiving the validated certificate signing request, the certification authority server 110 may decode it then compose a corresponding cryptographic certificate for the short-validity public key. The certification authority server 110 then signs the certificate with its own private key and relays it to the registration authority server 108.

Referring again to FIG. 9, the sub-process 900 may include the transmission of the signed public key certificate to the requesting device, at 914. For example, referring again to FIGS. 1 and 2, responsive to receiving the signed certificate for the short-validity public key from the certification authority server 110, the registration authority server 108 may transmit the signed certificate to the communication module 232.

Referring again to FIG. 9, the sub-process 900 may include, responsive to receiving the signed certificate for the short-validity public key, the storage of said certificate and its association with the short-validity key pair, at 916. For example, referring again to FIGS. 1 and 2, the communication module 232 may receive the signed certificate for the short-validity public key from the registration authority server 108, and relay it to the orchestration module 224. Responsive to receiving the signed certificate from the communication module 232, the orchestration module 224 may instruct the key storage and retrieval module 228 to store the signed certificate for the short-validity public key, passing a handle to the signed certificate itself, along with a handle to the short-validity key pair with which it should be associated. The key storage and retrieval module 228 may, in turn, store the signed certificate for the short-validity public key, along with the necessary data that associates the certificate with the short-validity key pair, in the file system 210, possibly leveraging interfaces in the orchestration module 224 and abstraction module 222 in the process. The key storage and retrieval module 228 may then signal the orchestration module 224 that the storage operation succeeded, which in turn successfully terminates sub-process 900.

Referring again to FIG. 3B, process 300 may include an evaluation of whether sub-process 900 was successful, at 336. For example, referring again to FIG. 2, the orchestration module 224 may receive results of sub-process 900 from the communication module 232 or the key storage and retrieval module 228, and make a determination as to whether or not the sub-process 900 was successful.

Referring again to FIG. 3B, if the evaluation of the results of sub-process 900 at 336 indicates a failure due to invalid attributes in the signed certificate signing request for the short-validity key pair, then the process 300 may be terminated with a corresponding error code, at 338. For example, referring again to FIG. 2, the orchestration module 224 may terminate process 300, returning an error to abstraction module 222 indicating that the short-validity certificate signing requested included invalid attributes. The abstraction module 222 may in turn respond to the application logic 214 with an error code indicating the same.

Referring again to FIG. 3B, responsive to the success of sub-process 900 as evaluated at 336, process 300 may terminate successfully at 340, indicating that all cryptographic credentials needed for connecting to the certification authority server infrastructure and signing media files are ready. For example, referring again to FIG. 2, the orchestration module 224 may terminate process 300, returning a message to the abstraction module 222 indicating that the controlled capture subsystem 220 is ready for capture in online mode. The abstraction module 222 may in turn relay the readiness message to the application logic 214 of the capture application 212. Responsive to receiving the confirmation that the controlled capture subsystem is ready, the application logic 214 may change the appearance, behavior, or exposed controls to indicate to an internal or external actor that the device is ready to capture authenticatable media files.

Referring again to FIG. 3A, if orchestration module 224 has made a determination at 304 that the controlled capture subsystem 220 has not been initialized, e.g., that this is not the first time that the controlled capture subsystem 220 has been invoked, then the process 300 may branch into the sub-process that begins with step 342 to load and evaluate existing cryptographic credentials, in preparation for enabling capture operations in either online mode or offline mode depending on real-time operating conditions.

Referring again to FIG. 3A, the process 300 may include an evaluation of whether or not the time-stamping server 104 is reachable over a network connection by the media capture device, at 342. For example, referring again to FIG. 2, the orchestration module 224 may request the communication module 232 to determine whether or not the time-stamping server 104 is reachable. The communication module 232 may in turn query the network service of connected media-capture device 200 to determine if the latter reports that the time-stamping server 104 is reachable.

If the evaluation of whether or not the time-stamping server 104 is reachable at 342 results in a "no" determination, then the process 300 transitions to preparing the device for capture in offline mode, at 344. For example, referring again to FIG. 2, if the communication module 232 reports back to the orchestration module 224 that the time-stamping server 104 is reachable, then the orchestration module 224 may instruct the key storage and retrieval module 228 to load the long-validity key pair and its associated signed certificate, passing along an identifier for the key pair and certificate. Responsive to receiving said command, the key storage and retrieval module 228 loads the long-validity key pair and associated signed certificate, and signals to the orchestration module 224 that the loading operation succeeded.

Referring again to FIG. 3A, responsive to the loading of the long-validity key pair and certificate at 344, process 300 may terminate successfully with a corresponding message, at 346. For example, referring again to FIG. 2, the orchestration module 224 may terminate the process 300, returning a message to the abstraction module 222 indicating that the controlled capture subsystem 220 is ready for capture in offline mode. The abstraction module 222 may in turn relay the readiness message to the application logic 214 of the capture application 212. Responsive to receiving the confirmation that the controlled capture subsystem is ready, the application logic 214 may change the appearance, behavior, or exposed controls to indicate to an internal or external actor that that device is ready to capture authenticatable media files, but in offline mode—that is, the time of capture cannot be guaranteed to downstream recipients of the media file since the device is offline.

If the evaluation of whether or not the device has a live network connection at 342 results in a "yes" determination, then the process 300 transitions to preparing the device for capture in online mode, starting by executing sub-process 1000 at 348. The purpose of sub-process 1000 is to establish a trusted local clock in the controlled capture subsystem 220 of FIG. 2, based on a time value obtained from the trusted time-stamping server 104 of FIG. 1.

Figure 10:
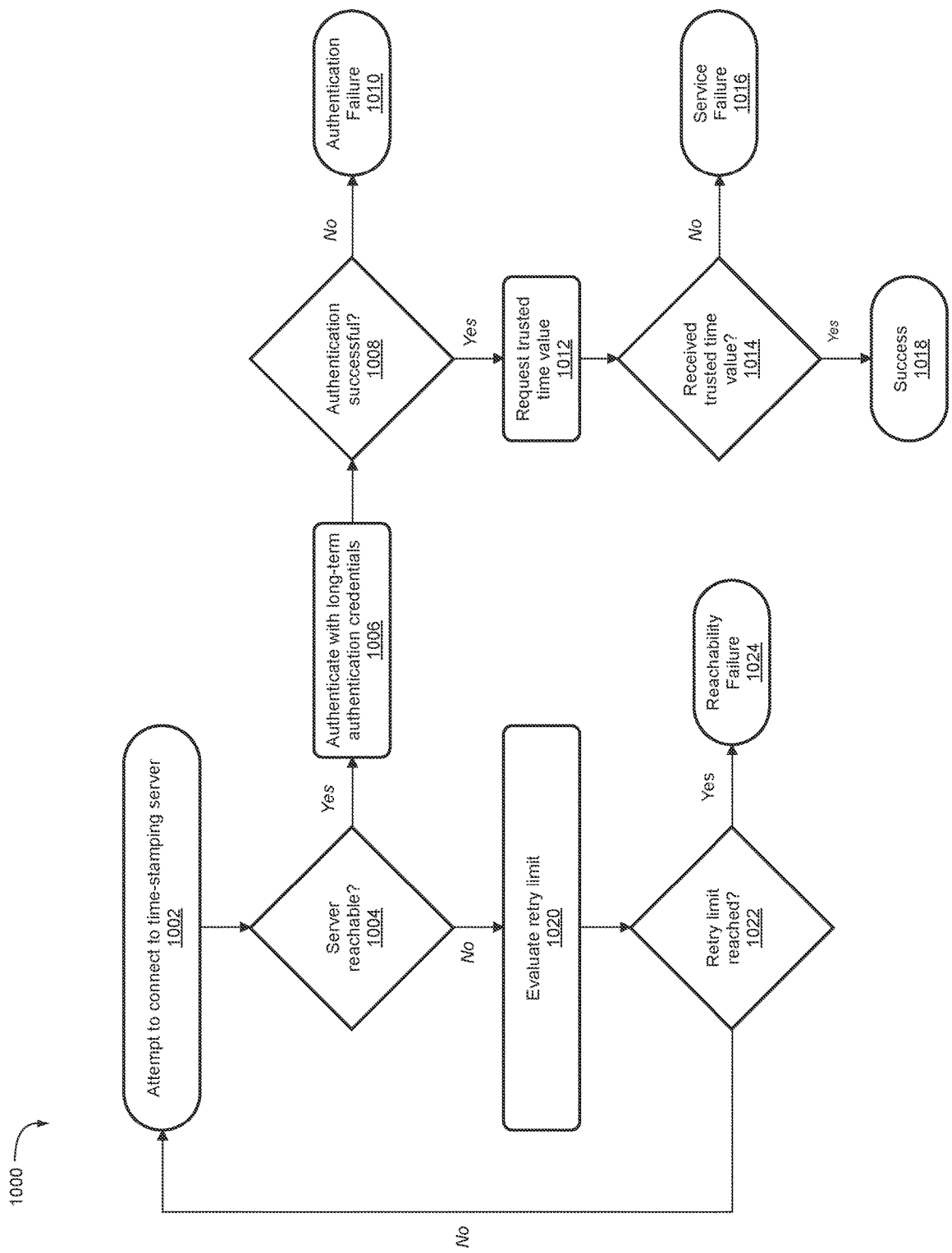
FIG. 10 represents a flowchart illustrating a sub-process for establishing a trusted local clock in the controlled capture subsystem of FIG. 2, based on a time value obtained from the trusted time-stamping server of FIG. 1.

Referring to FIG. 10, the sub-process 1000 may begin with an attempt to connect to the time-stamping server 104 of FIG. 1, at 1002. For example, referring again to FIG. 2, the orchestration module 224 may instruct the communication module 232 to attempt to establish a connection to the time-stamping server 104 of FIG. 1, passing along a handle to the long-term authentication credentials expected by the server. Additionally, the orchestration module 224 may pass along additional information needed by the communication module 232 to establish communication with the time-stamping server 104, such as the server's network address, server identity as stored in a cryptographic certificate, and/or a logical port address or logical service endpoint (for example, a uniform resource locator) that is designated to receive time synchronization requests.

Referring again to FIG. 10, the sub-process 1000 may include an evaluation of whether time-stamping server 104 of FIG. 1 was reachable over the network, at 1004. For example, referring again to FIG. 2, the communication module 232 may evaluate that the connection attempt made at 1002 was successful.

Referring again to FIG. 10, if the result of the evaluation at 1004 was "no", then a retry process may be started, as per 1020, 1022, and 1024. For example, referring again to FIG. 2, the communication module 232 may evaluate if it has already reached the retry limit at 1020, which may be the allowed limit of the total number of attempts made to connect to the time-stamping server 104 of FIG. 1, or the allowed limit of the total amount of time spent in attempting to establish a connection, a combination of the two, or some other retry limit. If the retry limit has not been reached per the evaluation at 1022, then the communication module 232 can attempt to establish communication again per 1002. If, on the other hand, the retry limit has been reached per the evaluation at 1022 without successfully establishing a connection with the time-stamping server 104 of FIG. 1, then the communication module 232 may end sub-process 1000 and return an error code at 1024 to the orchestration module 224, indicating a failure to connect to the time-stamping server 104 of FIG. 1.

Referring again to FIG. 10, if the result of the evaluation at 1004 was "yes", then an authentication process may be initiated with the time-stamping server 104 of FIG. 1, at 1006. For example, referring again to FIGS. 1 and 2, the time-stamping server 104 may issue an authentication challenge to communication module 232. Communication module 232 may then respond with an authentication reply that may include the long-term authentication credentials received at 612 of FIG. 6.

Referring again to FIG. 10, the sub-process 1000 may include an evaluation of whether the authentication with time-stamping server 104 of FIG. 1 was successful, at 1008. For example, referring again to FIGS. 1 and 2, the communication module 232 may await an authentication response from time-stamping server 104 then evaluate it.

Referring again to FIGS. 2 and 10, if the evaluation of the server's response indicates that authentication failed, then the communication module 232 may terminate sub-process 1000 and return an error code at 1010 to the orchestration module 224, indicating a failure to authenticate with the time-stamping server 104.

Referring again to FIG. 10, if the evaluation of the server's response at 1008 indicates that authentication succeeded, then sub-process 1000 may include the transmission of a request for the current time, at 1012. For example, referring again to FIGS. 1 and 2, the communication module 232 may transmit a request to the time-stamping server 104 whose purpose is to obtain the current time.

Referring again to FIG. 10, the sub-process 1000 may include an evaluation of whether or not a trusted time value was obtained from the time-stamping server 104 of FIG. 1, at 1014. For example, referring again to FIGS. 1 and 2, the communication module 232 may await a response from the time-stamping server 104, then decode it to determine whether it contains a trusted time value.

Referring again to FIG. 10, if the result of the evaluation at 1014 of whether or not a trusted time value was received is "no", then the communication module 232 may terminate sub-process 1000 and return an error code at 1016 to the orchestration module 224, indicating a service failure to obtain the current time.

Referring again to FIG. 10, if the result of the evaluation at 1014 of whether or not a trusted time value was received is "yes", then the communication module 232 may terminate sub-process 1000 successfully, and return a success message and the received trusted time value to orchestration module 224, at 1018.

Referring again to FIG. 3A, process 300 may include an evaluation of whether sub-process 1000 completed successfully, at 350. For example, referring again to FIG. 2, the orchestration module 224 may receive the results of sub-process 1000 from the communication module 232, and evaluate whether the sub-process 1000 was successful or not.

Referring again to FIG. 3A, if the result of the evaluation at 350 of whether or not sub-process 1000 was successful is "no", then process 300 may include an evaluation of the reason of the failure of sub-process 1000, at 352. For example, referring again to FIG. 2, the orchestration module 224 may evaluate, responsive to receiving a failing result from the communication module 232, whether the failure was a service failure, a reachability failure, or an authentication failure.

Referring again to FIG. 3A, if the reason for the failure as determined at 352 is inability to obtain a trusted time value, then process 300 may be terminated with a corresponding error code, at 354. For example, referring again to FIG. 2, the orchestration module 224 may terminate process 300 and return an error to the abstraction module 222, indicating a failure to obtain a trusted time value. The abstraction module 222 may in turn relay the error message to the application logic 214, indicating the inability of the controlled capture subsystem 220 to obtain a trusted time value.

Referring again to FIG. 3A, if the reason for the failure as determined at 352 is reachability, then process 300 may be terminated with a corresponding error code, at 320. For example, referring again to FIG. 2, the orchestration module 224 may terminate process 300 and return an error to the abstraction module 222, indicating that the server is temporarily unreachable. The abstraction module 222 may in turn relay the error message to the application logic 214, indicating that the controlled capture subsystem 220 is temporarily unable to reach the server.

Referring again to FIGS. 3A and 3B, if the reason for the failure as determined at 352 is authentication, then process 300 may be terminated with a corresponding error code, at 370. For example, referring again to FIG. 2, the orchestration module 224 may terminate process 300 and return an error to the abstraction module 222, indicating that authentication with the server failed. The abstraction module 222 may in turn relay the error message to the application logic 214, indicating that the controlled capture subsystem 220 was unable to authenticate with the server.

Referring again to FIG. 3A, if the result of the evaluation at 350 of whether or not sub-process 1000 was successful is "yes", then process 300 may include an initiation of a local clock based on the received trusted time value, at 356. For example, referring again to FIG. 2, the orchestration module 224 may store the trusted time value received at 348, and use it to calculate the true current time in subsequent steps.

Referring again to FIG. 3A, process 300 may include a retrieval of the latest stored certificate for a short-validity public key, at 358. For example, referring again to FIG. 2, the orchestration module 224 may instruct the key storage and retrieval module 228 to load the stored short-validity key pair and its associated certificate. Responsive to this request, the key storage and retrieval module 228 loads the latest available short-validity key pair and certificate, and passes handles to both back to the orchestration module 224. The orchestration module 224 in turn decodes the short-validity certificate and extracts its validity time window.

Referring again to FIG. 3A, process 300 may include an evaluation of whether the latest available short-validity certificate is within its validity window, at 360. For example, referring again to FIG. 2, the orchestration module may compare the validity window of the certificate loaded and decoded at 358 against the local clock initiated from the trusted time value at 356.

Referring again to FIGS. 3A and 3B, if the result of the evaluation at 360 of whether or not the latest short-term validity certificate is within its validity windows is "yes", then process 300 may terminate successfully at 340, indicating that all cryptographic credentials needed for connecting to the certification authority server infrastructure and signing media files are ready. For example, referring again to FIG. 2, the orchestration module 224 may terminate process 300, returning a message to the abstraction module 222 indicating that the controlled capture subsystem 220 is ready for capture in online mode. The abstraction module 222 may in turn relay the readiness message to the application logic 214 of the capture application 212. Responsive to receiving the confirmation that the controlled capture subsystem is ready, the application logic 214 may change the appearance, behavior, or exposed controls to indicate to an internal or external actor that that device is ready to capture authenticatable media files.

Referring again to FIGS. 3A and 3B, if the result of the evaluation at 360 of whether or not the latest short-term validity certificate is within its validity windows is "no", then process 300 may include the execution of sub-process 500 as previously described, at 362.

Referring again to FIG. 3B, following the successful completion of sub-process 500 at 362, the process 300 may include the execution of sub-process 700 as previously described, at 364.

Referring again to FIG. 3B, process 300 may include an evaluation of whether sub-process 700 as executed at 364 was successful, at 366. For example, referring again to FIG. 2, the orchestration module 224 may receive results of sub-process 700 from the communication module 232 and make a determination as to whether or not the sub-process 700 was successful.

Referring again to FIG. 3B, if the evaluation of the results of sub-process 700 at 366 indicates a failure, then the process 300 may include an evaluation of the reason for sub-process 700's failure, at 368. Process 300 then proceeds from 368 forward as previously outlined.

Referring again to FIG. 3B, if the evaluation of the results of sub-process 700 at 366 indicates success, then process 300 transitions to step 334 (executing sub-process 900), and proceeds forward from there as previously outlined.

If process 300 successfully terminated at either 346 (on FIG. 3A) or 340 (on FIG. 3B), then the controlled capture subsystem 220 of connected media-captured device 200 (both of FIG. 2) would be ready for capturing authenticatable media files as commanded by the application logic 214. If process 300 terminated successfully at 346, then the controlled capture subsystem 220 would be ready for capture in offline mode. If process 300 terminated successfully at 340, then the controlled capture subsystem 220 would be ready for capture in online mode.

Figure 11A:
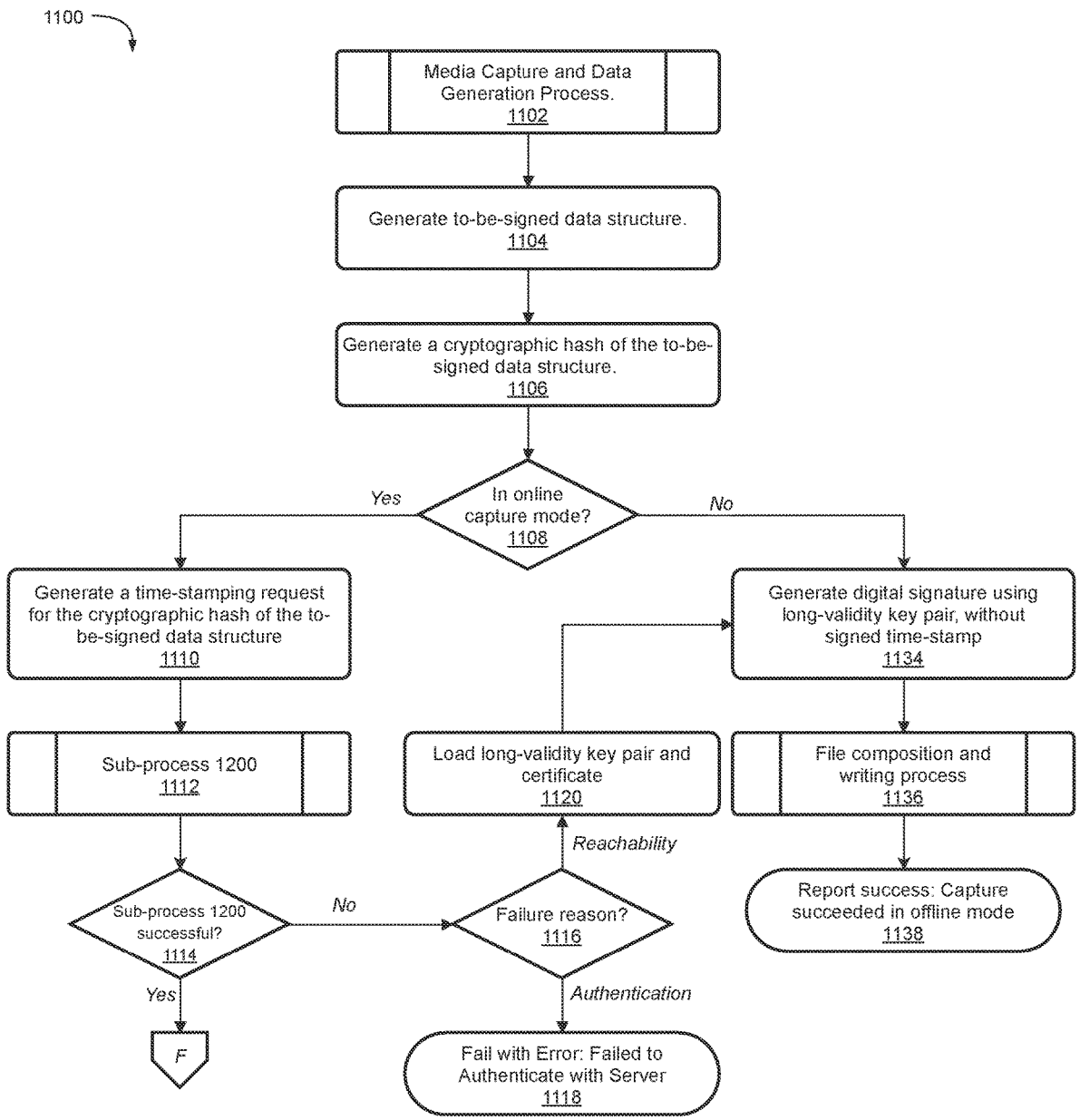
FIGS. 11A and 11B are a flowchart illustrating a process for capturing and cryptographically sealing digital media files, making them authenticatable, in a connected media-capturing device according to some embodiments of the disclosed technologies.
Figure 11B:
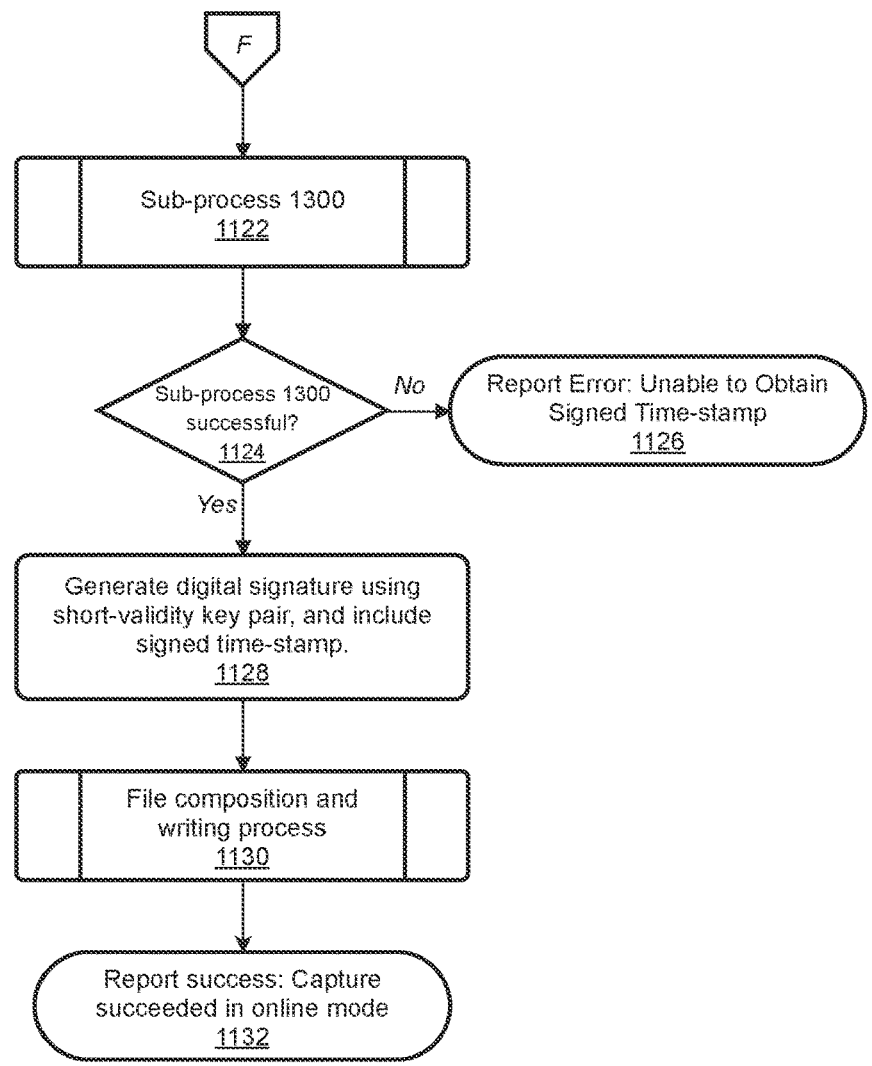

Process 1100, as outlined in FIGS. 11A and 11B, details a possible flow for cryptographically sealing captured media files using either the long-validity key pair or the short-validity key pair that were readied in process 300 of FIGS. 3A and 3B.

Referring to FIGS. 2 and 11A, capture process 1100 begins with a series of steps related to data acquisition and generation that are represented as a sub-process that is executed at 1102. The sub-process may include the acquiring, digitizing, and encoding analog phenomena 204 through sensor data acquisition module(s) 206 and sensor data encoding module(s) 208, resulting in encoded sensor data snapshot values. Additional data may also be generated, for example including auxiliary data and protectable non-sensor data. As used herein the term "auxiliary data" refers to data about the encoded sensor data snapshot values received from the sensor data encoding modules 208, that may help a downstream recipient, whether machine or human, to better understand, evaluate, or process the encoded sensor data snapshot value. As used herein the term "protectable non-sensor data" refers to data whose integrity needs to be protected as part of the overall media file container, but which does not originate from the digitization of an analog phenomenon captured by a sensor. Protectable non-sensor data may be needed by a downstream recipient, whether machine or human, to properly decode and interpret the contents of the media file container. This entire process of acquiring, digitizing, and encoding sensor data, followed optionally by generating auxiliary data and protectable non-sensor data, would be orchestrated by orchestration module 224 responsive to a capture command originating in application logic 214 and relayed through abstraction module 222. The precise steps required to complete the above process, for the purposes of this invention, are treated together as a sub-process that is executed at 1102.

Referring again to FIG. 11A, the process 1100 may include generating a "to-be-signed" data structure containing the data and/or the cryptographic hashes of the data that is to be protected by the digital signature data structure, at 1104. For example, referring again to FIG. 2, the orchestration module 224 may generate a data structure that may be a composite of one or more encoded sensor data snapshot values, one or more associated auxiliary data, one or more protectable non-sensor data, and/or the cryptographic hashes of each. The orchestration module 224 may format this "to-be-signed" data structure in a way that complies with the expectations of downstream recipients, for example the tools that may perform authentication and verification of the signed data.

Referring again to FIG. 11A, the capture process 1100 may include generating a cryptographic hash of the "to-be-signed" data structure, at 1106. For example, referring again to FIG. 2, the orchestration module 224 may then engage the cryptographic operations module 230 to hash the "to-be-signed" data structure.

Referring again to FIG. 11A, the capture process 1100 may include an evaluation of whether the connected media-capture device is in online capture mode, at 1108. For example, referring again to FIG. 2, the orchestration module 224 may evaluate its current internal status, based on whether process 300 of FIGS. 3A and 3B terminated at 340 or 346.

Referring again to FIG. 11A, if the result of the evaluation at 1108 of the current operating mode is "yes", then capture process 1100 transitions to step 1110, generating a time-stamping request for the cryptographic hash of the to-be-signed data structure that was generated at 1106. For example, referring again to FIGS. 1 and 2, the orchestration module 224 may compose a time-stamping request formatted in a structure that is expected by time-stamping server 104, which contains, among other things, the hash of the to-be-signed data structure as generated at 1106 by the cryptographic operations module 230.

Referring again to FIG. 11A, responsive to the successful generation of a time-stamping request at 1110, capture process 1100 may include a sub-process 1200, at 1112. Sub-process 1200 is concerned with acquiring a signed time-stamp for the to-be-signed data structure.

Figure 12:
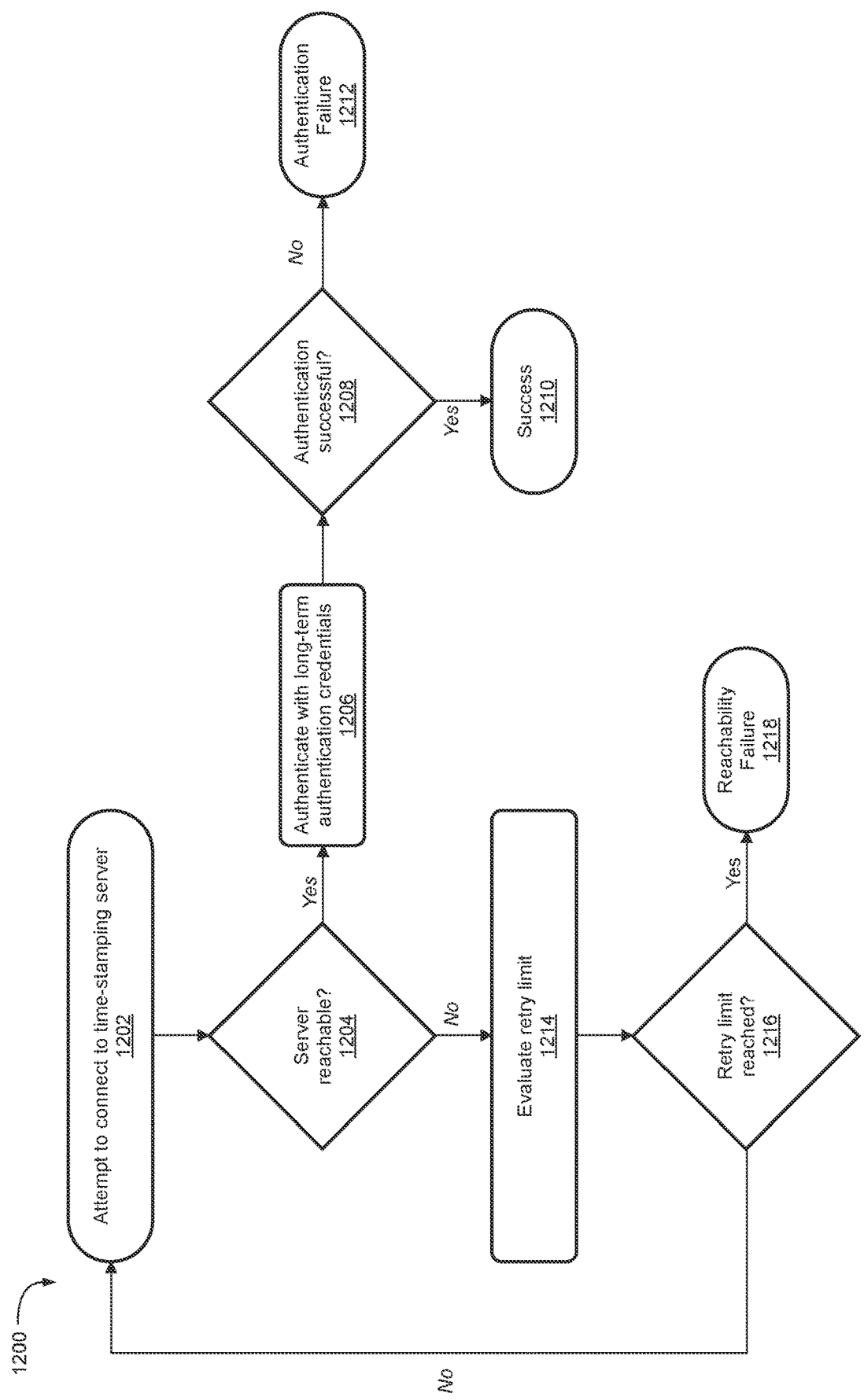
FIG. 12 represents a flowchart illustrating a sub-process for acquiring a signed time-stamp for a to-be-signed data structure.

Referring to FIG. 12, the sub-process 1200 may begin with an attempt to connect to the time-stamping server 104 of FIG. 1, at 1202. For example, referring again to FIG. 2, the orchestration module 224 may instruct the communication module 232 to attempt to establish a connection to the time-stamping server 104 of FIG. 1, passing along a handle to the long-term authentication credentials expected by the server. Additionally, the orchestration module 224 may pass along additional information needed by the communication module 232 to establish communication with the time-stamping server 104, such as the server's network address, server identity as stored in a cryptographic certificate, and/or a logical port address or logical service endpoint (for example, a uniform resource locator) that is designated to receive time-stamping requests.

Referring again to FIG. 12, the sub-process 1200 may include an evaluation of whether time-stamping server 104 of FIG. 1 was reachable over the network, at 1204. For example, referring again to FIG. 2, the communication module 232 may evaluate that the connection attempt made at 1202 was successful.

Referring again to FIG. 12, if the result of the evaluation at 1204 was "no", then a retry process may be started, as per 1214, 1216, and 1218. For example, referring again to FIG. 2, the communication module 232 may evaluate if it has already reached the retry limit at 1214, which may be the allowed limit of the total number of attempts made to connect to the time-stamping server 104 of FIG. 1, or the allowed limit of the total amount of time spent in attempting to establish a connection, a combination of the two, or some other retry limit. If the retry limit has not been reached per the evaluation at 1214, then the communication module 232 can attempt to establish communication again, at 1202. If, on the other hand, the retry limit has been reached per the evaluation at 1214 without successfully establishing a connection with the time-stamping server 104 of FIG. 1, then the communication module 232 may end sub-process 1200 and return an error code at 1218 to the orchestration module 224, indicating a failure to connect to the time-stamping server 104 of FIG. 1.

Referring again to FIG. 12, if the result of the evaluation at 1204 was "yes", then an authentication process may be initiated with the time-stamping server 104 of FIG. 1, at 1206. For example, referring again to FIGS. 1 and 2, the time-stamping server 104 may issue an authentication challenge to communication module 232. Communication module 232 may then respond with an authentication reply that may include the long-term authentication credentials received at 612 of FIG. 6.

Referring again to FIG. 12, the sub-process 1200 may include an evaluation of whether the authentication with time-stamping server 104 of FIG. 1 was successful, at 1208. For example, referring again to FIGS. 1 and 2, the communication module 232 may await an authentication response from time-stamping server 104 then evaluate it.

Referring again to FIGS. 2 and 12, if the evaluation of the server's response indicates that authentication failed, then the communication module 232 may terminate sub-process 1200 and return an error code at 1212 to the orchestration module 224, indicating a failure to authenticate with the time-stamping server 104.

Referring again to FIG. 12, if the evaluation of the server's response at 1208 indicates that authentication succeeded, then sub-process 1200 may be terminated successfully, at 1210. For example, referring again to FIG. 2, the communication module 232 may terminate sub-process 1200 and return a success code to the orchestration module 224.

Referring again to FIG. 11A, the capture process 1100 may include an evaluation of whether or not sub-process 1200 at 1112 terminated successfully, at 1114. For example, referring again to FIG. 2, the orchestration module 224 may receive the result of sub-process 1200 from the communication module 232, and evaluate that result to determine whether it was successful.

Referring again to FIG. 11A, if the result of the evaluation at 1114 of the success of sub-process 1200 is "no", then capture process 1100 may include an evaluation of the reason of the failure of sub-process 1200, at 1116. For example, referring again to FIG. 2, the orchestration module 224 may evaluate the error code received from the communication module 232 to determine whether sub-process 1200 terminated because of a reachability failure or an authentication failure.

If the result of the evaluation at 1116 of the reason of the failure of sub-process 1200 at 1112 is authentication, then process 1100 may be terminated with a corresponding error code, at 1118. For example, referring again to FIG. 2, the orchestration module 224 may terminate process 1100 and return an error to the abstraction module 222, indicating that authentication with the server failed. The abstraction module 222 may in turn relay the error message to the application logic 214, indicating that the controlled capture subsystem 220 was unable to complete the capture process due to its inability to authenticate with the server.

If the result of the evaluation at 1116 of the reason of the failure of sub-process 1200 at 1112 is reachability, then process 1100 may include the loading of the long-validity cryptographic key pair and its associated certificate, at 1120. For example, referring again to FIG. 2, the orchestration module 224 may instruct the key storage and retrieval module 228 to load the long-validity key pair and its associated signed certificate, possibly passing along an identifier for the key pair and certificate. Responsive to receiving said command, the key storage and retrieval module 228 loads the long-validity key pair and associated signed certificate, and signals to the orchestration module 224 that the loading operation succeeded.

Referring again to FIG. 11A, responsive to the successful loading of the long-validity key pair and its associate certificate at 1120, the capture process 1100 may include the generation of a digital signature data structure over the to-be-signed data structure, using the long-validity key pair and without including a signed time-stamp, at 1134. For example, referring again to FIG. 2, the orchestration module 224 may command the cryptographic operations module 230 to generate a digital signature data structure, passing along handles to the to-be-signed data structure, the long-validity key pair, and the associated certificate for the long-validity public key. The cryptographic operations module 230 in turn may generate the digital signature data structure in a format expected by downstream recipients, constrained with the attributes of the long-validity key pair such as key length and signature algorithm. The format of the digital signature data structure may include an embedded and appropriately encoded copy of the certificate for the long-validity public key. Upon the successful generation of the digital signature data structure, the cryptographic operations module 230 returns a success message to the orchestration module 224, passing back a handle to the newly created digital signature data structure.

Referring again to FIG. 11A, responsive to the successful creation of a digital signature data structure using the long-validity key pair that does not contain a signed time-stamp at 1134, process 1100 may include the composition of the final media file at 1136. For example, referring again to FIG. 2, the orchestration module 224 may compose a data structure that contains the encoded sensor snapshot value(s), associated auxiliary data (if any), protectable non-sensor data (if any), to-be-signed data structure, and the digital signature data structure generated at 1134. The orchestration module may then write this data structure as a file in the file system 210, possibly through the abstraction module 222.

Referring again to FIG. 11A, the capture process 1100, responsive to the successful writing of the final file with an offline-generated digital signature data structure to the device's file system at 1136, may terminate successfully with a corresponding message at 1138. For example, referring again to FIG. 2, the orchestration module 224 may successfully terminate process 1100, returning a success message to the abstraction module 222 indicating that the capture operation succeeded in offline mode. The abstraction module 222 may in turn return a success message to the application logic 214, indicating that the capture operation succeeded in offline mode.

Referring again to FIGS. 11A and 11B, if the result of the evaluation at 1114 of the success of sub-process 1200 is "yes", then capture process 1100 may include the execution of sub-process 1300, at 1122. Sub-process 1300 attempts to obtain a signed time-stamp from the time-stamping server 104 of FIG. 1 in response to the time-stamping request generated at 1110 of FIG. 11A.

Figure 13:
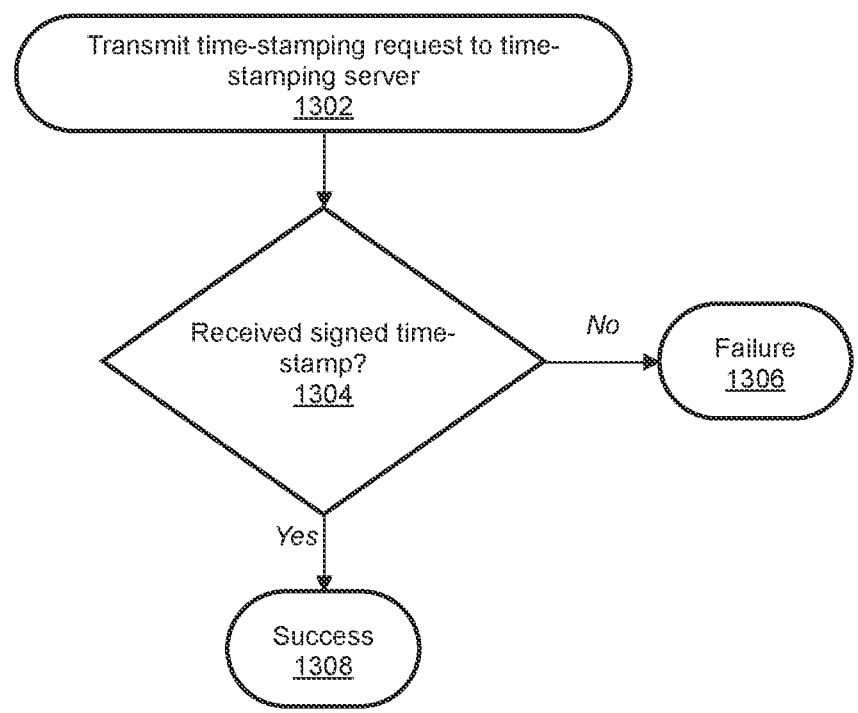
FIG. 13 represents a flowchart illustrating a sub-process for attempting to obtain a signed time-stamp from the time-stamping server of FIG. 1 in response to the time-stamping request generated in FIG. 11A.

Referring to FIG. 13, the sub-process 1300 may begin with the transmission of the time-stamping request to the time-stamping server, at 1302. For example, referring again to FIGS. 1 and 2, the orchestration module 224 may instruct the communication module 232 to obtain a signed time-stamp from the time-stamping server 104, passing along a handle to the time-stamping request generated at 1110 of FIG. 11A. The communication module 232 may in turn transmit the time-stamping request to the time-stamping server 104, and await a response.

Referring again to FIG. 13, the sub-process 1300 may include an evaluation of whether or not a signed time-stamp was received in response to the transmission of the time-stamping request, at 1304. For example, referring again to FIGS. 1 and 2, the communication module 232 may evaluate the response received from time-stamping server 104.

If the result of the evaluation of whether a signed time-stamp was received is "no", then the sub-process 1300 may be terminated with a corresponding error, at 1306. For example, referring again to FIG. 2, the communication module 232 may terminate the sub-process 1300, returning an error code to orchestration module 224 indicating that it was unable to obtain a signed time-stamp from the time-stamping server 104 of FIG. 1.

If the result of the evaluation of whether a signed time-stamp was received is "yes", then the sub-process 1300 may be terminated successfully with a corresponding message, at 1308. For example, referring again to FIG. 2, the communication module 232 may successfully terminate the sub-process 1300, returning a success code to the orchestration module 224, along with a handle to the received signed time-stamp.

Referring again to FIG. 11B, the capture process 1100 may include an evaluation of whether or not the sub-process 1300 at 1122 completed successfully, at 1124. For example, referring again to FIG. 2, the orchestration module 224 may receive the result of sub-process 1300 from the communication module 232, and evaluate it.

If the result of the evaluation at 1124 of whether sub-process 1300 at 1122 completed successfully is "no", then the capture process 1100 may be terminated with a corresponding error code, at 1126. For example, referring again to FIG. 2, the orchestration module 224 may terminate process 1100 and return an error to the abstraction module 222, indicating that the it was unable to obtain a signed time-stamp from the time-stamping server 104 of FIG. 1. The abstraction module 222 may in turn relay the error message to the application logic 214, indicating that the controlled capture subsystem 220 was unable to complete the capture process due to the inability to obtain a signed time-stamp from the time-stamping server 104 of FIG. 1.

If the result of the evaluation at 1124 of whether sub-process 1300 at 1122 completed successfully is "yes", then the capture process 1100 may include the generation of a digital signature data structure over the to-be-signed data structure, using the short-validity key pair and a signed time-stamp, at 1128. For example, referring again to FIG. 2, the orchestration module 224 may command the cryptographic operations module 230 to generate a digital signature data structure, passing along handles to the to-be-signed data structure, the short-validity key pair, the associated certificate for the short-validity public key, and the signed time-stamp obtained as a result of sub-process 1300 at 1122. The cryptographic operations module 230 in turn may generate the digital signature data structure in a format expected by downstream recipients, constrained with the attributes of the short-validity key pair such as key length and signature algorithm. The format of the digital signature data structure may include an embedded and appropriately encoded copy of the certificate for the short-validity public key, along with an embedded and appropriately encoded copy of the signed time-stamp obtained at 1122. Upon the successful generation of the digital signature data structure, the cryptographic operations module 230 returns a success message to the orchestration module 224, passing back a handle to the newly created digital signature data structure.

Referring again to FIG. 11B, responsive to the successful creation of a digital signature data structure using the short-validity key pair that contains a signed time-stamp at 1128, process 1100 may include the composition of the final media file, at 1130. For example, referring again to FIG. 2, the orchestration module 224 may compose a data structure that contains the encoded sensor snapshot value(s), associated auxiliary data (if any), protectable non-sensor data (if any), to-be-signed data structure, and the digital signature data structure generated at 1128. The orchestration module may then write this data structure as a file in the file system 210, possibly through the abstraction module 222.

Referring again to FIG. 11B, the capture process 1100, responsive to the successful writing of the final file with an online-generated digital signature data structure to the device's file system at 1130, may terminate successfully with a corresponding message at 1132. For example, referring again to FIG. 2, the orchestration module 224 may successfully terminate process 1100, returning a success message to the abstraction module 222 indicating that the capture operation succeeded in online mode. The abstraction module 222 may in turn return a success message to the application logic 214, indicating that the capture operation succeeded in online mode.

Figure 14:
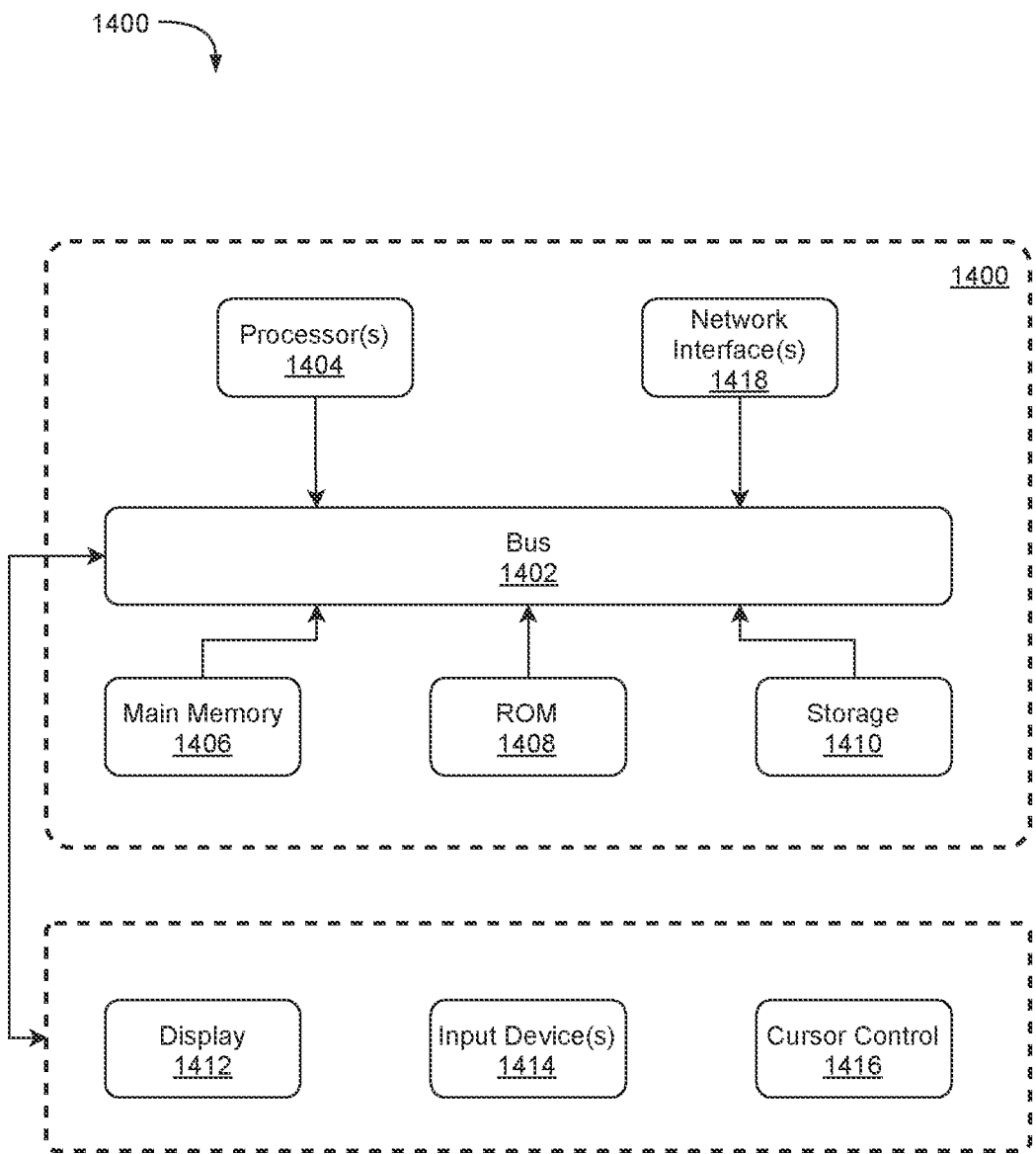
FIG. 14 is an example computing component that may be used to implement various features of embodiments described in the present disclosure.

FIG. 14 depicts a block diagram of an example computer system 1400 in which embodiments described herein may be implemented. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a liquid crystal display (LCD) (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. In some embodiments, the same direction information and command selections as cursor control may be implemented via receiving touches on a touch screen without a cursor.

The computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

The computer system 1400 also includes a communication interface 1418 coupled to bus 1402. Network interface 1418 provides a two-way data communication coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, network interface 1418 may be a local area network (LAN) card to provide a data communication connection to a compatible LAN (or a WAN component to communicate with a WAN). Wireless links may also be implemented. In any such implementation, network interface 1418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network(s), network link and communication interface 1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A media-capture device, comprising:
    one or more sensors;
    a hardware processor; and
    a non-transitory machine-readable storage medium encoded with instructions executable by the hardware processor to perform a method comprising:
        initiating acquisition of one or more sensor data samples representing analog phenomena captured by the one or more sensors;
        receiving the one or more sensor data samples;
        responsive to receiving the one or more sensor data samples, encoding the one or more sensor data samples;
        generating a to-be-signed data structure comprising at least one of:
            the one or more encoded sensor data samples, or
            one or more cryptographic hashes of the one or more encoded sensor data samples;
        generating a cryptographic hash of the to-be-signed data structure;
        determining whether a time-stamping server is reachable over a network connection by the media capture device;
        responsive to determining the time-stamping server is reachable:
            transmitting a time-stamping request to the time-stamping server, wherein the time-stamping request includes the cryptographic hash of the to-be-signed data structure;
            receiving a signed time-stamp from the time-stamping server; and
            generating a digital signature data structure over the to-be-signed data structure using the private key of a short-validity cryptographic key pair and including the received signed time-stamp in the digital signature data structure;
        responsive to determining the time-stamping server is reachable, and prior to transmitting the time-stamping request to the time-stamping server:
            determining whether a certificate for a short-validity cryptographic key pair is valid; and
            responsive to determining the certificate of the short-validity cryptographic key pair is invalid:
                generating a new short-validity cryptographic key pair comprising a new short-validity public key and a new short-validity private key with short-validity key attributes,
                generating a certificate signing request for the new short-validity public key,
                signing the certificate signing request with the new short-validity private key, and
                transmitting the signed certificate signing request to a registration authority server at the designated logical service endpoint for short-validity key pairs; and
        configuring a second data structure based on the determination of whether the time-stamping server is reachable and to include the one or more sensor encoded or unencoded data samples, the to-be-signed data structure, and the digital signature data structure,
    wherein, responsive to receiving the signed certificate signing request:
        the registration authority server validates eligibility of the media-capture device to receive a certificate, and
        validates that the certificate signing request for the new short-validity public key meets required attributes for short-validity key pairs; and
    wherein, responsive to a successful validation of both device eligibility and short-validity key attributes, the registration authority server relays the signed certificate signing request for the new short-validity public key to a certification authority server;
    wherein, responsive to receiving the related signed certificate signing request for the short-validity public key, the certification authority server issues a signed certificate for the new short-validity public key and relays the signed certificate to the registration authority server;
    wherein, responsive to receiving the signed certificate for the new short-validity public key, the registration authority server relays the signed certificate for the new short-validity public key to the media-capture device; and responsive to receiving the signed certificate for the new short-validity public key, storing the signed certificate for the new short-validity public key.

2. The media-capture device of claim 1, the method further comprising:
    transmitting a trusted-time request to the time-stamping server;

receiving a trusted-time value from the time-stamping server; and initiating a local clock of the media-capture device using the trusted-time value;

wherein determining whether the certificate of the short-validity cryptographic key pair is valid comprises: comparing a validity window of the certificate of the short-validity cryptographic key pair against the local clock.

3. The media-capture device of claim 2, the method further comprising:

authenticating with the time-stamping server using long-term authentication credentials prior to transmitting the trusted-time request to the time-stamping server.

4. A media-capture device, comprising:
one or more sensors;
a hardware processor; and
a non-transitory machine-readable storage medium encoded with instructions executable by the hardware processor to perform a method comprising:
  initiating acquisition of one or more sensor data samples representing analog phenomena captured by the one or more sensors;
  receiving the one or more sensor data samples;
  responsive to receiving the one or more sensor data samples, encoding the one or more sensor data samples;
  generating a to-be-signed data structure comprising at least one of:
    the one or more encoded sensor data samples, or
    one or more cryptographic hashes of the one or more encoded sensor data samples;
  generating a cryptographic hash of the to-be-signed data structure;
  determining whether a time-stamping server is reachable over a network connection by the media capture device;
  responsive to determining the time-stamping server is not reachable:
    generating a further digital signature data structure over the to-be-signed data structure using the private key of a long-validity cryptographic key pair, without including a signed time-stamp; and
    configuring the second data structure to include the one or more sensor encoded or unencoded data samples, the to-be-signed data structure, and the further digital signature data structure that does not include a signed time-stamp.

5. The media-capture device of claim 1, the method further comprising:

storing the second data structure in a file system of the media-capture device.

6. A media-capture device, comprising:
one or more sensors;
a hardware processor; and
a non-transitory machine-readable storage medium encoded with instructions executable by the hardware processor to perform a method comprising:
  initiating acquisition of one or more sensor data samples representing analog phenomena captured by the one or more sensors;
  receiving the one or more sensor data samples;
  responsive to receiving the one or more sensor data samples, encoding the one or more sensor data samples;
  generating a to-be-signed data structure comprising at least one of:
    the one or more encoded sensor data samples, or
    one or more cryptographic hashes of the one or more encoded sensor data samples;
  generating a cryptographic hash of the to-be-signed data structure;
  determining whether a time-stamping server is reachable over a network connection by the media capture device;
  configuring a second data structure based on the determination of whether the time-stamping server is reachable;

determining whether the media-capture device has been initialized; and responsive to determining the media-capture device has not been initialized, authenticating with a registration authority server using first-time authentication credentials;

responsive to successful authentication using the first-time authentication credentials by the registration authority server, transmitting a request for long-term authentication credentials to the registration authority server;

responsive to receiving long-term authentication credentials from the registration authority server, storing the long-term authentication credentials for use in subsequent connection attempts to the registration authority server;

generating a new long-validity cryptographic key pair, comprising a new public key and a new private key with long-validity key attributes by:
  generating a certificate signing request for the new long-validity public key,
  signing the certificate signing request with the new long-validity private key, and
  transmitting the signed certificate signing request to a registration authority server at the designated logical service endpoint for long-validity key pairs,
  wherein, responsive to receiving the signed certificate signing request, the registration authority server validates eligibility of the media-capture device to receive a certificate, and validates that the certificate signing request for the new long-validity public key meets required attributes for long-validity key pairs; and
  responsive to a successful validation of both device eligibility and long-validity key attributes, the registration authority server relays the signed certificate signing request for the new long-validity public key to a certification authority server;
  wherein, responsive to receiving the related signed certificate signing request for the new long-validity public key, the certification authority server issues a signed certificate for the new long-validity public key and relays the signed certificate to the registration authority server;
  wherein, responsive to receiving the signed certificate for the new long-validity public key, the registration authority server relays the signed certificate for the new long-validity public key to the media-capture device; and responsive to receiving the signed certificate for the new long-validity public key:
  storing the signed certificate for the new long-validity public key, and
  generating a short-validity cryptographic key pair, comprising a new public key and a new private key with short-validity key attributes, generating a certificate signing request for the new short-validity public key, signing the certificate signing request with the new short-validity private key, and transmitting the signed certificate signing request to a registration authority server at the designated logical service endpoint for short-validity key pairs, wherein, responsive to receiving the signed certificate signing request, the registration authority server validates the eligibility of the media-capture device to receive a certificate and validates that the certificate signing request for the new short-validity public key meets the required attributes for short-validity key pairs; and responsive to a successful validation of both device eligibility and short-validity key attributes, the registration authority server relays the signed certificate signing request for the new short-validity public key to a certification authority server;

wherein, responsive to receiving the related signed certificate signing request for the new short-validity public key, the certification authority server issues a signed certificate for the new short-validity public key and relays the signed certificate to the registration authority server;

wherein, responsive to receiving the signed certificate for the new short-validity public key, the registration authority server relays the signed certificate for the new short-validity public key to the media-capture device; and responsive to receiving the signed certificate for the new short-validity public key, storing the signed certificate for the new short-validity public key.

7. A non-transitory machine-readable storage medium encoded with instructions executable by a hardware processor of a computing component, the machine-readable storage medium comprising instructions to cause the hardware processor to perform a method for a media-capture device having one or more sensors, the method comprising:

initiating acquisition of one or more sensor data samples representing analog phenomena captured by the one or more sensors;

receiving the one or more sensor data samples;

responsive to receiving the one or more sensor data samples, encoding the one or more sensor data samples;

generating a to-be-signed data structure comprising at least one of:
  the one or more encoded sensor data samples, or
  one or more cryptographic hashes of the one or more encoded sensor data samples;

generating a cryptographic hash of the to-be-signed data structure;

determining whether a time-stamping server is reachable over a network connection by the media capture device;

responsive to determining the time-stamping server is reachable:
  transmitting a time-stamping request to the time-stamping server, wherein the time-stamping request includes the cryptographic hash of the to-be-signed data structure;
  receiving a signed time-stamp from the time-stamping server; and
  generating a digital signature data structure over the to-be-signed data structure using the private key of a short-validity cryptographic key pair and including the received signed time-stamp in the digital signature data structure;

responsive to determining the time-stamping server is reachable, and prior to transmitting the time-stamping request to the time-stamping server:
  determining whether a certificate for a short-validity cryptographic key pair is valid; and
  responsive to determining the certificate of the short-validity cryptographic key pair is invalid:
    generating a new short-validity cryptographic key pair, and
    transmitting a certificate-signing request to a certification authority server, the certificate-signing request including short-validity parameters of the new short-validity cryptographic key pair, wherein the certification authority server signs the certificate-signing request with a private key of the new short-validity cryptographic key pair; and configuring a second data structure based on the determination of whether the time-stamping server is reachable and to include the one or more sensor encoded or unencoded data samples, the to-be-signed data structure, and the digital signature data structure.

8. The non-transitory machine-readable storage medium of claim 7, the method further comprising:

transmitting a trusted-time request to the time-stamping server;

receiving a trusted-time value from the time-stamping server; and initiating a local clock of the media-capture device using the trusted-time value;

wherein determining whether the certificate of the short-validity cryptographic key pair is valid comprises: comparing a validity window of the certificate of the short-validity cryptographic key pair against the local clock.

9. The non-transitory machine-readable storage medium of claim 8, the method further comprising:

authenticating with the time-stamping server using long-term authentication credentials prior to transmitting the trusted-time request to the time-stamping server.

10. The non-transitory machine-readable storage medium of claim 7, the method further comprising:

responsive to determining the time-stamping server is not reachable:

generating a further digital signature over the to-be-signed data structure using a private key of a long-validity cryptographic key pair; and configuring the second data structure to include the one or more sensor encoded or unencoded data samples, the to-be-signed data structure, and the further digital signature.

11. The non-transitory machine-readable storage medium of claim 7, the method further comprising:

storing the second data structure in a file system of the media-capture device.

12. A non-transitory machine-readable storage medium encoded with instructions executable by a hardware processor of a computing component, the machine-readable storage medium comprising instructions to cause the hardware processor to perform a method for a media-capture device having one or more sensors, the method comprising:

initiating acquisition of one or more sensor data samples representing analog phenomena captured by the one or more sensors;

receiving the one or more sensor data samples;
responsive to receiving the one or more sensor data samples, encoding the one or more sensor data samples;
generating a to-be-signed data structure comprising at least one of:
  the one or more encoded sensor data samples, or
  one or more cryptographic hashes of the one or more encoded sensor data samples;
generating a cryptographic hash of the to-be-signed data structure;
determining whether a time-stamping server is reachable over a network connection by the media capture device;
determining whether the media capture device has been initialized;
responsive to determining the media-capture device has not been initialized, generating a long-validity cryptographic key pair, generating a short-validity cryptographic key pair, and transmitting a request for long-term authentication credentials to a registration authority server; and
configuring a second data structure based on the determination of whether the time-stamping server is reachable.

13. A computer-implemented method for a media-capture device having one or more sensors, the method comprising:
initiating acquisition of one or more sensor data samples representing analog phenomena captured by the one or more sensors;
receiving the one or more sensor data samples;
responsive to receiving the one or more sensor data samples, encoding the one or more sensor data samples;
generating a to-be-signed data structure comprising at least one of:
  the one or more encoded sensor data samples, or
  one or more cryptographic hashes of the one or more encoded sensor data samples;
generating a cryptographic hash of the to-be-signed data structure;
  determining whether a time-stamping server is reachable over a network connection by the media capture device;
responsive to determining the time-stamping server is reachable:
  transmitting a time-stamping request to the time-stamping server, wherein the time-stamping request comprises the cryptographic hash of the to-be-signed data structure;
  receiving a signed time-stamp from the time-stamping server; and
  generating a digital signature over the to-be-signed data structure and the signed time-stamp using a private key of a short-validity cryptographic key pair;
responsive to determining the time-stamping server is reachable, and prior to transmitting the time-stamping request to a time-stamping server:
  determining whether a certificate of the short-validity cryptographic key pair is valid; and
  responsive to determining the certificate of the short-validity cryptographic key pair is invalid:
    generating a new short-validity cryptographic key pair, and
    transmitting a certificate-signing request to a certification authority server, the certificate-signing request including short-validity parameters of the new short-validity cryptographic key pair, wherein the certification authority server signs the certificate-signing request with a private key of the new short-validity cryptographic key pair; and
configuring a second data structure based on the determination of whether the time-stamping server is reachable and to include the one or more sensor encoded or unencoded data samples, the to-be-signed data structure, and the digital signature.

14. The computer-implemented method of claim 13, further comprising:
transmitting a trusted-time request to the time-stamping server;
receiving a trusted-time value from the time-stamping server; and
initiating a local clock of the media-capture device using the trusted-time value;
wherein determining whether the certificate of the short-validity cryptographic key pair is valid comprises: comparing a validity window of the certificate of the short-validity cryptographic key pair against the local clock.

15. The computer-implemented method of claim 14, further comprising:
authenticating with the time-stamping server using long-term authentication credentials prior to transmitting the trusted-time request to the time-stamping server.

16. The computer-implemented method of claim 13, further comprising:
responsive to determining the time-stamping server is not reachable:
  generating a further digital signature over the to-be-signed data structure using a private key of a long-validity cryptographic key pair; and
  configuring the second data structure to include the one or more sensor encoded or unencoded data samples, the to-be-signed data structure, and the further digital signature.

17. The computer-implemented method of claim 13, further comprising:
storing the second data structure in a file system of the media-capture device.

18. A computer-implemented method for a media-capture device having one or more sensors, the method comprising:
initiating acquisition of one or more sensor data samples representing analog phenomena captured by the one or more sensors;
receiving the one or more sensor data samples;
responsive to receiving the one or more sensor data samples, encoding the one or more sensor data samples;
generating a to-be-signed data structure comprising at least one of:
  the one or more encoded sensor data samples, or
  one or more cryptographic hashes of the one or more encoded sensor data samples;
generating a cryptographic hash of the to-be-signed data structure;
determining whether a time-stamping server is reachable over a network connection by the media capture device;
determining whether the media-capture device has been initialized;
responsive to determining the media-capture device has not been initialized, generating a long-validity cryptographic key pair, generating a short-validity cryptographic key pair, and transmitting a request for long-term authentication credentials to a registration authority server; and configuring a second data structure based on the determination of whether the time-stamping server is reachable.

\* \* \* \* \*